(12) United States Patent
Kato et al.

(10) Patent No.: US 6,957,088 B2
(45) Date of Patent: Oct. 18, 2005

(54) ELECTRONIC APPARATUS

(75) Inventors: Hirokazu Kato, Inasa-gun (JP); Hideki Sato, Toyooka-mura (JP); Michihiko Goto, Hamamatsu (JP); Toshihiko Muramatsu, Toyooka-mura (JP)

(73) Assignee: Yamaha Corporation (JP)

( * ) Notice: Subject to any disclaimer, the term of this patent is extended or adjusted under 35 U.S.C. 154(b) by 384 days.

(21) Appl. No.: 10/301,660

(22) Filed: Nov. 22, 2002

(65) Prior Publication Data

US 2003/0134665 A1 Jul. 17, 2003

(30) Foreign Application Priority Data

| Nov. 22, 2001 | (JP) | ......................................... | 2001-357538 |
| Nov. 22, 2001 | (JP) | ......................................... | 2001-357859 |
| Jan. 7, 2002 | (JP) | ......................................... | 2002-000773 |
| Mar. 1, 2002 | (JP) | ......................................... | 2002-056529 |

(51) Int. Cl.[7] ................................................ H04Q 7/20
(52) U.S. Cl. ..................... 455/566; 455/575; 455/457
(58) Field of Search ........................... 455/566, 575, 455/457, 456, 404; 701/213; 340/988; 345/156, 161, 158; 463/37, 38, 30

(56) References Cited

U.S. PATENT DOCUMENTS

| 6,314,183 | B1 | * | 11/2001 | Pehrsson et al. | ....... | 379/433.06 |
| 6,496,179 | B1 | * | 12/2002 | Toda | ........................... | 345/163 |
| 6,798,429 | B2 | * | 9/2004 | Bradski | ....................... | 345/156 |
| 6,816,148 | B2 | * | 11/2004 | Mallett et al. | .............. | 345/157 |
| 2001/0029430 | A1 | * | 10/2001 | Tamura | ....................... | 701/213 |
| 2002/0058517 | A1 | * | 5/2002 | Furukawa et al. | .......... | 455/456 |
| 2004/0095317 | A1 | * | 5/2004 | Zhang et al. | ................ | 345/158 |

FOREIGN PATENT DOCUMENTS

| JP | 6-12185 | 1/1994 |
| JP | 7-64754 | 3/1995 |
| JP | 8-95539 | 4/1996 |
| JP | 09-311625 | 12/1997 |
| JP | 10-63411 | 3/1998 |
| JP | 10-160474 | 6/1998 |
| JP | 11-083532 | 3/1999 |
| JP | 11-325904 | 11/1999 |
| JP | 2001-289646 | 10/2001 |

OTHER PUBLICATIONS

Japanese Office Action issued Apr. 19, 2005 (w/English translation of relevant portions).

* cited by examiner

*Primary Examiner*—Nick Corsaro
*Assistant Examiner*—Tan Trinh
(74) *Attorney, Agent, or Firm*—Dickstein, Shapiro, Morin & Oshinsky, LLP

(57) ABSTRACT

A cellular phone includes an X-axis magnetic sensor for outputting a first value corresponding to a component of an external magnetic field along the direction of a transverse axis of the main body, and a Y-axis magnetic sensor for outputting a second value corresponding to a component of the external magnetic field along the direction of a longitudinal axis of the main body. The cellular phone includes a ROM which stores a conversion table defining the relation between the first and second values and values of azimuth and inclination angle of the longitudinal axis of the main body. The cellular phone determines the azimuth and inclination angle on the basis of the first and second values actually output from the X-axis and Y-axis magnetic sensors and with reference to the conversion table.

18 Claims, 21 Drawing Sheets

θ : ANGLE BETWEEN MAGNETIZATION DIRECTION OF FIXED MAGNETIZATION LAYER AND THAT OF FREE LAYER

| RANGE OF Δβ | Y-DIRECTION SCROLL | RANGE OF Δγ | X-DIRECTION SCROLL |
|---|---|---|---|
| 1deg < Δβ ≤ 5deg | -10m/TIME | 1deg < Δγ ≤ 5deg | -10m/TIME |
| 5deg < Δβ ≤ 10deg | -50m/TIME | 5deg < Δγ ≤ 10deg | -50m/TIME |
| 10deg < Δβ ≤ 15deg | -100m/TIME | 10deg < Δγ ≤ 15deg | -100m/TIME |
| 15deg < Δβ ≤ 20deg | -300m/TIME | 15deg < Δγ ≤ 20deg | -300m/TIME |
| 20deg < Δβ ≤ 30deg | -500m/TIME | 20deg < Δγ ≤ 30deg | -500m/TIME |
| 30deg < Δβ | -1Km/TIME | 30deg < Δγ | -1Km/TIME |
| -1deg > Δβ ≥ -5deg | 10m/TIME | -1deg > Δγ ≥ -5deg | 10m/TIME |
| -5deg > Δβ ≥ -10deg | 50m/TIME | -5deg > Δγ ≥ -10deg | 50m/TIME |
| -10deg > Δβ ≥ -15deg | 100m/TIME | -10deg > Δγ ≥ -15deg | 100m/TIME |
| -15deg > Δβ ≥ -20deg | 300m/TIME | -15deg > Δγ ≥ -20deg | 300m/TIME |
| -20deg > Δβ ≥ -30deg | 500m/TIME | -20deg > Δγ ≥ -30deg | 500m/TIME |
| Δβ < -30deg | 1Km/TIME | Δγ < -30deg | 1Km/TIME |

FIG.20

ELECTRONIC APPARATUS

BACKGROUND OF THE INVENTION

1. Field of the Invention

The present invention relates to an electronic apparatus which includes in its main body a first-axis magnetic sensor for outputting a value corresponding to a component of an external magnetic field along the direction of a first axis and a second-axis magnetic sensor for outputting a value corresponding to a component of the external magnetic field along the direction of a second axis intersecting the first axis at a predetermined angle and which can detect the azimuth of a third axis of the main body and/or the inclination angle of the third axis on the basis of the values output from these magnetic sensors.

2. Description of the Related Art

Recently, incorporation of a magnetic sensor into an electronic apparatus such as a cellular phone has been considered, with an aim toward detecting the direction of the local geomagnetic field by use of the magnetic sensor, to thereby impart an azimuth detection function to the electronic apparatus. In such a case, since such a magnetic sensor is desired to be small, there may be employed a two-direction detection type magnetic sensor (an X-Y axis terrestrial magnetism sensor) which includes an X-axis magnetic sensor serving as a first-axis magnetic sensor for detecting a magnetic field component along the direction of a transverse axis of the main body and a Y-axis magnetic sensor serving as a second-axis magnetic sensor for detecting a magnetic field component along the direction of a longitudinal axis of the main body perpendicular to the transverse axis.

Incidentally, the direction of the local geomagnetic field forms a predetermined angle with respect to a horizontal plane, whereas the inclination of the local geomagnetic field varies from location to location. Further, in many cases, an electronic apparatus such as a cellular phone is used in a state in which the longitudinal axis of the main body inclines by a predetermined inclination angle with respect to the horizontal plane. Therefore, the angle between the local geomagnetic field and the longitudinal axis of the electronic apparatus changes depending on the location where the electronic apparatus is used and the inclination angle of the electronic apparatus during use, even if the azimuth of the longitudinal axis is maintained constant. Since output of the Y-axis magnetic sensor changes due to influences of not only azimuth but other factors (i.e., inclination of the geomagnetic field and inclination of the longitudinal axis), azimuth may be erroneously detected when the electronic apparatus is configured so as to recognize output of the X-axis magnetic sensor and output of the Y-axis magnetic sensor as detection values of the local geomagnetic field and determine the azimuth of the longitudinal axis on the basis of the detection values only, on the assumption that the inclination angle is constant.

SUMMARY OF THE INVENTION

In view of the foregoing, an object of the present invention is to provide an electronic apparatus which uses a first-axis magnetic sensor for detecting a magnetic field component along the direction of a first axis, a second-axis magnetic sensor for detecting the magnetic field component along the direction of a second axis intersecting the first axis at a predetermined angle, and a conversion table in order to accurately determine the inclination angle and/or azimuth of a predetermined axis (third axis) of a main body thereof.

Another object of the present invention is to provide an electronic apparatus which uses the first-axis magnetic sensor, the second-axis magnetic sensor, and the conversion table in order to determine the inclination angle of the predetermined axis (third axis) of the main body thereof, without use of an inclination angle sensor or any other sensor.

Still another object of the present invention is to provide an electronic apparatus which can determine changes in angle of the longitudinal axis and/or angle of the transverse axis of the electronic apparatus, as well as an electronic apparatus which can utilize such changes in angle for, for example, display of a map or progress in a game (control of a game).

An electronic apparatus according to the present invention comprises: a main body; a first-axis magnetic sensor fixedly disposed within the main body and outputting a value corresponding to a component of an external magnetic field along a direction of a first axis of the main body (e.g., the transverse axis of the main body); a second-axis magnetic sensor fixedly disposed within the main body and outputting a value corresponding to a component of the external magnetic field along a direction of a second axis of the main body (e.g., the longitudinal axis of the main body), the second axis intersecting the first axis at a predetermined angle (e.g., 90°); and inclination angle determination means for determining an inclination angle of a third axis of the main body (e.g., the longitudinal axis) relative to a reference plane (e.g., a horizontal plane) on the basis of values actually output from the first-axis and second-axis magnetic sensors and with reference to a conversion table defining a relation between the values output from the first-axis and second-axis magnetic sensors and inclination angle of the third axis.

The first to third axes of the main body may be determined freely, so long as the first and second axes intersect each other at a predetermined angle (e.g., 90°). For example, one of the first and second axes may coincide with the third axis. Alternatively, in the case of an electronic apparatus, such as a cellular phone, whose main body has predetermined longitudinal and transverse axes in the state of use, the third axis may be the longitudinal axis of the main body. Further, in this case, the first axis may be the transverse axis of the main body, and the second axis may be the longitudinal axis of the main body.

As described previously, when the location of use of the electronic apparatus is found (known), the inclination of the geomagnetic field relative to a horizontal plane can be specified. Therefore, when the electronic apparatus is assumed to be used at a known location, the azimuth α of the third axis, which is an arbitrary axis of the main body (e.g., the longitudinal axis of the main body) and the inclination angle β of the third axis relative to a reference plane (e.g., a horizontal plane) can be substantially specified based on a set of values (Sx, Sy); i.e., the value Sx output from the first-axis magnetic sensor and the value Sy output from the second-axis magnetic sensor.

On the basis of the above-described findings, in the present invention, the inclination angle β of the third axis relative to the reference plane is determined on the basis of values output from the first-axis and second-axis magnetic sensors and with reference to the conversion table, which defines a relation between values output from the first-axis and second-axis magnetic sensors and inclination angle of the third axis.

Preferably, the electronic apparatus includes a display section for displaying a screen on the basis of various data, and display control means for changing the displayed screen on the basis of the determined inclination angle.

By virtue of the above-described configuration, without incorporation of an additional sensor, such as an inclination angle sensor, into the electronic apparatus, a screen (image) displayed on the display section of the electronic apparatus can be controlled (e.g., scrolled) through a simple operation of tilting the electronic apparatus, which carries the first and second magnetic sensors for detecting components of a magnetic field along different directions.

The present invention provides an electronic apparatus which comprises the above-described first-axis and second-axis magnetic sensors; and azimuth-inclination angle determination means for determining an azimuth of a third axis of the main body and an inclination angle of the third axis relative to a reference plane on the basis of values actually output from the first-axis and second-axis magnetic sensors and with reference to a conversion table defining relations between values output from the first-axis and second-axis magnetic sensors and azimuth of the third axis and between the values and inclination angle of the third axis.

On the basis of the previously described findings, the electronic apparatus is configured in order to determine the azimuth and inclination angle of the third axis of the main body through utilization of a conversion table defining relations between values output from the first-axis and second-axis magnetic sensors and the azimuth of the third axis of the main body and between the values and the inclination angle of the third axis relative to the reference plane. The electronic apparatus can detect the azimuth and the inclination angle by use of a magnetic sensor (an X-Y two-axis magnetic sensor) without use of an inclination angle sensor.

Preferably, the electronic apparatus includes game execution means for executing a game program to thereby provide a game to a user and for changing the progress of the game on the basis of the determined azimuth and inclination angle. In this case, the phrase "changing the progress of the game on the basis of the determined azimuth and inclination angle" encompasses not only the case in which the progress of the game is changed on the basis of the azimuth and the inclination angle, but also the case in which the progress of the game is changed on the basis of the azimuth and an inclination angle change (a change in the inclination angle), the case in which the progress of the game is changed on the basis of an azimuth angle change (a change in the azimuth angle) and the inclination angle, and the case in which the progress of the game is changed on the basis of the azimuth angle change and the inclination angle change.

The above-described configuration enables the user to change the progress of the game by changing the azimuth and inclination angle of the electronic apparatus. Accordingly, the electronic apparatus can provide a game which can impart to the user an operation feeling which the user has never experienced. Moreover, the electronic apparatus can provide developers of game software with an opportunity to develop games (game programs) in which the azimuth and the inclination angle can be utilized in progress of the games.

In the electronic apparatus capable of determining the azimuth and inclination angle thereof, preferably, a longitudinal axis in the state of use and a transverse axis perpendicular to the longitudinal axis are defined for the main body, the first axis corresponding to the transverse axis, and the second and third axes corresponding to the longitudinal axis; and the electronic apparatus further comprises longitudinal-axis change angle calculation means for saving as a reference inclination angle the inclination angle determined by the azimuth-inclination angle determination means, and for calculating a change in the inclination angle of the longitudinal axis from the reference inclination angle on the basis of the reference inclination angle and an inclination angle presently determined by the azimuth-inclination angle determination means.

In the electronic apparatus, a change in the inclination angle of the longitudinal axis from the reference inclination angle can be calculated on the basis of the reference inclination angle and an inclination angle presently determined by the azimuth-inclination angle determination means, without use of an additional sensor such as an inclination angle sensor.

Further, in the electronic apparatus capable of determining the azimuth and inclination angle thereof, preferably, a longitudinal axis in the state of use and a transverse axis perpendicular to the longitudinal axis are defined; the first axis corresponds to the transverse axis, and the second and third axes correspond to the longitudinal axis; and the electronic apparatus includes longitudinal-axis change angle calculation means for saving, as a reference azimuth and a reference inclination angle, the azimuth and inclination angle determined by the azimuth-inclination angle determination means, and for calculating a change in the inclination angle of the longitudinal axis from the reference inclination angle on the basis of the reference azimuth, the reference inclination angle, and the value output from the second-axis magnetic sensor. In the present specification, the term "longitudinal axis" refers to an axis which extends along the vertical direction on the front face of the electronic apparatus; and the term "transverse axis" refers to an axis which extends along the horizontal or lateral direction on the front face of the electronic apparatus.

In the electronic apparatus, a change in the inclination angle of the longitudinal axis from the reference inclination angle can be calculated by use of only the first-axis (X-axis) magnetic sensor, which outputs a value corresponding to a component of an external magnetic field along the transverse axis of the apparatus (i.e., along the transverse axis of the main body of the apparatus), and the second axis (Y-axis) magnetic sensor, which outputs a value corresponding to a component of the external magnetic field along the longitudinal axis of the main body; i.e., without use of an additional sensor such as an inclination angle sensor.

In this case, preferably, the electronic apparatus includes a display section for displaying a screen on the basis of various data, and display control means for scrolling the displayed screen along the direction of the longitudinal axis when the calculated change in the inclination angle is non-zero.

This configuration enables a user to scroll the screen displayed on the display section along the direction of the longitudinal axis by means of tilting the electronic apparatus in a vertical plane passing through the longitudinal axis, without provision of an additional dedicated sensor.

In this case, preferably, the display control means is configured to change the scroll speed of the screen in accordance with the magnitude of the calculated change in the inclination angle.

This configuration enables scrolling of the displayed screen to be controlled in accordance with the extent of the user's tilting operation.

Preferably, the display control means is configured not to scroll the screen when the calculated change in the inclination angle falls below a predetermined level.

Since this configuration prevents the scrolling operation from being performed in response to slight tilting of the apparatus main body, erroneous scrolling operation can be avoided, thereby improving the stability of the displayed screen.

Moreover, in the electronic apparatus capable of determining the azimuth and inclination angle thereof, preferably, a longitudinal axis in the state of use and a transverse axis perpendicular to the longitudinal axis are defined; the first axis corresponds to the transverse axis, and the second and third axes correspond to the longitudinal axis; and the electronic apparatus includes transverse-axis change angle calculation means for saving, as a reference azimuth and a reference inclination angle, the azimuth and inclination angle determined by the azimuth-inclination angle determination means, and for calculating a change in the angular position of the transverse axis about the longitudinal axis on the basis of the reference azimuth, the reference inclination angle, and the value output from the first-axis magnetic sensor.

In the electronic apparatus, a change in the angular position of the transverse axis about the longitudinal axis can be calculated by use of only the first-axis (X-axis) magnetic sensor, which outputs a value corresponding to a component of an external magnetic field along the transverse axis of the apparatus, and the second axis (Y-axis) magnetic sensor, which outputs a value corresponding to a component of the external magnetic field along the longitudinal axis of the main body; i.e., without use of an additional sensor such as an inclination angle sensor.

In this case, preferably, the electronic apparatus includes a display section for displaying a screen on the basis of various data, and display control means for scrolling the displayed screen along the direction of the transverse axis when the calculated change in the angular position of the transverse axis about the longitudinal axis is non-zero.

This configuration enables a user to scroll the screen displayed on the display section along the direction of the transverse axis by rotating the electronic apparatus about the longitudinal axis, without provision of an additional dedicated sensor.

In this case, preferably, the display control means is configured to change the scroll speed of the screen in accordance with the magnitude of the calculated change in the angular position of the transverse axis about the longitudinal axis.

This configuration enables scrolling of the displayed screen to be controlled in accordance with the extent of the user's tilting or rotating operation.

Preferably, the display control means is configured not to scroll the screen when the calculated change in the angular position of the transverse axis about the longitudinal axis falls below a predetermined level.

Since this configuration prevents the scrolling operation from being performed in response to slight rotation of the apparatus main body about the longitudinal axis, erroneous scrolling operation can be avoided, thereby improving the stability of the displayed screen.

Further, the electronic apparatus preferably includes communication means for effecting communications with the outside, and conversion table obtaining means for obtaining values of the conversion table via the communication means.

The values of the conversion table may be previously stored in storage means such as ROM. However, when the electronic apparatus is configured to obtain the values of the conversion table from the outside by use of communication means, the azimuth and/or the inclination angle can be obtained by use of the conversion table even when the storage means has a limited storage capacity.

Moreover, the electronic apparatus preferably includes position data obtaining means for obtaining position data indicating the position of the main body, and the conversion table obtaining means is preferably configured to obtain values of the conversion table corresponding to the position of the main body represented by the obtained position data.

As described previously, the inclination of the geomagnetic field relative to a horizontal plane changes depending on location, and therefore, values of the conversion table to be used must be changed according to the location where the electronic apparatus is to be used. Accordingly, when the electronic apparatus is configured to obtain values of the conversion table corresponding to the position of the main body of the electronic apparatus as described above, the azimuth and/or the inclination angle can be determined accurately even when the electronic apparatus is used over a wide area.

Preferably, the electronic apparatus includes azimuth display means for displaying the determined azimuth by use of a predetermined image when the determined inclination angle is a predetermined angle, and for displaying the determined azimuth while distorting the predetermined image to an increasing degree in response to an increase in the determined inclination angle (i.e., while distorting the predetermined image by a larger degree as the determined inclination angle increases).

By virtue of the above-described configuration, when the inclination angle is a predetermined angle (e.g., 0°), the determined azimuth is displayed by use of the predetermined image, which is distorted to an increasing degree in response to an increase in the determined inclination angle. As a result, a user encounters difficulty in visually recognizing the azimuth unless the user maintains the inclination angle at the predetermined angle. Accordingly, the electronic apparatus can urge the user to measure the azimuth while (or by) maintaining the third axis of the main body (e.g., the longitudinal axis of the main body) parallel to a plane which forms the predetermined angle with respect to the reference plane (e.g., when the reference plane is a horizontal plane and the predetermined angle is zero, the third axis is likely to be maintained parallel to the horizontal plane).

By virtue of the above-described configuration, when the reference plane and the predetermined angle are set in such a manner that the electronic apparatus can measure the azimuth with high accuracy (e.g., a horizontal plane is used as the reference plane, and the predetermined angle is set to zero), there can be increased the probability of azimuth measurement being performed in the state in which the electronic apparatus is maintained at a posture for realizing highly accurate azimuth measurement. Therefore, the electronic apparatus can provide the user with more accurate data regarding the azimuth.

The present invention provides another electronic apparatus comprising: a main body; a first-axis magnetic sensor fixedly disposed within the main body and outputting a value corresponding to a component of an external magnetic field along a direction of a first axis of the main body; a second-axis magnetic sensor fixedly disposed within the main body and outputting a value corresponding to a component of the external magnetic field along a direction of a second axis of the main body, the second axis intersecting the first axis at a predetermined angle; position data obtaining means for obtaining position data indicating the position of the main body; communication means for communicating with a center; conversion table obtaining means for transmitting the obtained position data to the center via the communication means and for receiving table values of a first conversion table from the center when the center determines that the main body is present within an inclination correctable area in which the geomagnetic field is known, and receiving table values of a second conversion table or a signal from the center when the center determines that the main body is not present within the inclination correctable area, the first conversion table defining relations between values output from the first-axis and second-axis magnetic sensors and an azimuth of a third axis of the main body and between the values and an inclination angle of the third axis relative to a reference plane, the second conversion table defining a relation between values output from the first-axis and second-axis magnetic sensors and azimuth of the third axis on the assumption that the inclination angle of the third axis relative to the reference plane is a predetermined constant angle, the signal indicating to the effect that the inclination angle must be assumed to be the predetermined constant angle; and azimuth-inclination angle determination means for determining the azimuth and inclination angle of the third axis on the basis of values actually output from the first-axis and second-axis magnetic sensors and with reference to the obtained table values or the signal indicating to the effect that the inclination angle must be assumed to be the predetermined constant angle.

Specifically, the electronic apparatus obtains position data indicating the position of the main body (i.e., specifies the position of the main body), and transmits the position data to a center (information center) having a server or a like computer. On the basis of the position data, the center determines where the main body is present within an inclination correctable area. The inclination correctable area refers to an area for which data regarding the geomagnetic field (the geomagnetic vector) is possessed by the center. For example, within a building or underground passage, the geomagnetic field may be weakened or distorted by, for example, shielding. Therefore, the center does not possess data regarding the geomagnetic field in such an area. Accordingly, such an area falls (is) outside the inclination correctable area, and the azimuth and the inclination angle cannot be obtained with desired accuracy even when the table values of the conversion table held by the center are used in such an area.

In view of the above, when the main body is determined to be located within the inclination correctable area, the center transmits to the electronic apparatus the table values of the first conversion table, which defines the relations between values output from the first-axis and second-axis magnetic sensors and the azimuth of the third axis of the main body and between the values and the inclination angle of the third axis relative to the reference plane. By contrast, when the main body is determined to be located outside the inclination correctable area, the center transmits to the electronic apparatus the table values of the second conversion table defining a relation between values output from the first-axis and second-axis magnetic sensors and azimuth of the third axis on the assumption that the inclination angle of the third axis relative to the reference plane is a predetermined constant angle. In this case, alternatively, the center transmits to the electronic apparatus the signal indicating to the effect that the inclination angle must be assumed to be the predetermined constant angle. Subsequently, the electronic apparatus determines the azimuth and inclination angle of the third axis on the basis of the obtained table values or the signal. As a result, when the main body is located within the inclination correctable area, the electronic apparatus can determine the azimuth and inclination angle of the main body with high accuracy. Further, when the main body is not located within the inclination correctable area, there can be avoided an erroneous operation in which, despite the inclination angle of the main body being zero, the inclination angle is displayed as having some magnitude.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 20 is a diagram relating to a fourth embodiment of the present invention and showing a table which the CPU refers to when scrolling the displayed screen.

DESCRIPTION OF THE PREFERRED EMBODIMENTS

Figure 1:
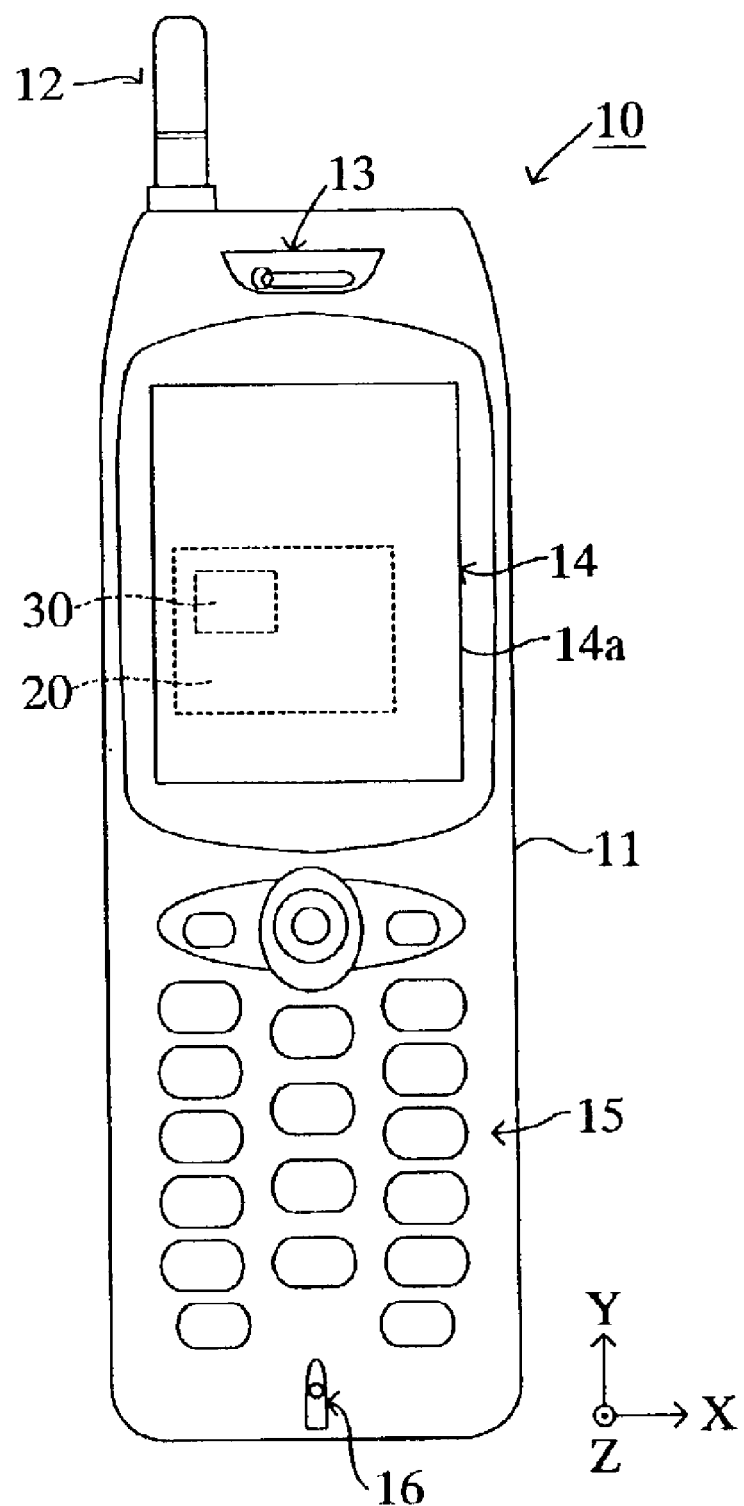
FIG. 1 is a front view of a cellular phone according to the present invention.

Embodiments of the present invention will be described with reference to the drawings.

First, a first embodiment of the electronic apparatus according to the present invention will be described. As shown in a schematic front view of FIG. 1, a cellular phone 10 serving as an electronic apparatus has a main body 11, which assumes a shape of a generally rectangular parallelepiped having sides that respectively extend along an X-axis, a Y-axis, and a Z-axis which mutually intersect perpendicularly. In this example, when the main body 11 is in a state of use, the X-axis coincides with a transverse axis or first axis of the main body 11, and the Y-axis coincides with a longitudinal axis or second axis of the main body 11. Further, in this example, the Y-axis serves as a third axis of the main body 11, while a horizontal plane serves as a reference plane; an azimuth α is defined as an azimuth of a positive direction along the Y-axis; and an inclination angle β is defined as an angle between the Y-axis (on the positive side) and the horizontal plane serving as a reference plane. In other words, the Y-axis serves as a reference axis for detection of the azimuth α and the inclination angle β.

The cellular phone 10 includes an antenna section 12 disposed at a top side-surface of the main body 11; a speaker section 13 disposed at an uppermost portion of a front face of the main body 11, which is parallel to a plane (an X-Y plane) defined by the X-axis and the Y-axis; a liquid crystal display section (display section) 14 disposed on the front face of the main body 11 to be located below the speaker section 13 and adapted to display characters, symbols, or a graphical image such as a map; an operation section 15 disposed on the front face of the main body 11 to be located below the display section 14 and used for inputting phone numbers and other instruction signals; a microphone section 16 disposed at a lowermost portion of the front face of the main body 11; and an electric controller 20 accommodated inside the main body 11.

Figure 2:
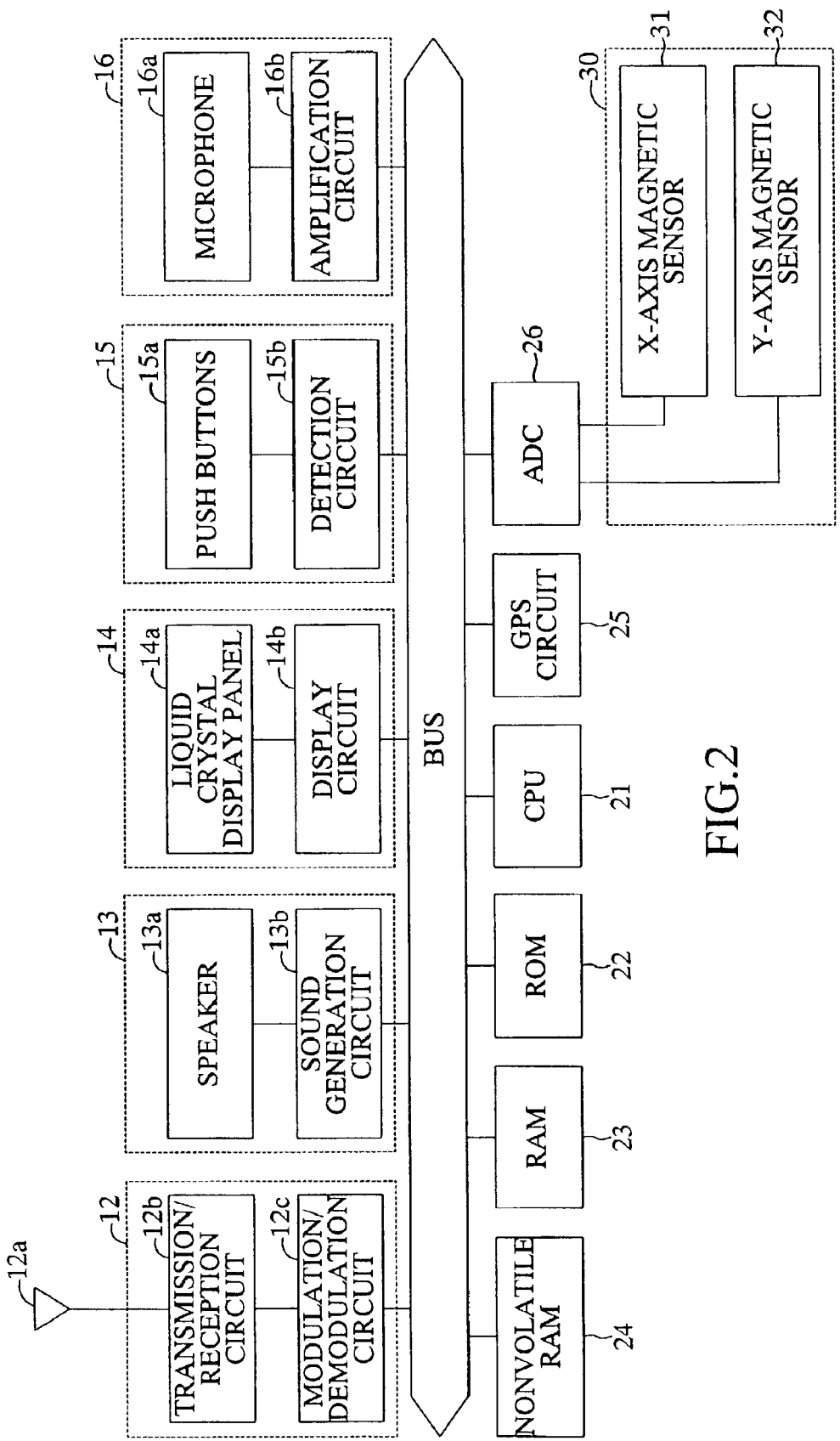
FIG. 2 is a block diagram showing the configuration of an electric circuit of the cellular phone shown in FIG. 1.

As shown in a schematic block diagram of FIG. 2, the electric controller 20 includes respective functional sections of the antenna section 12, the speaker section 13, the liquid crystal display section 14, the operation section 15, and the microphone section 16, as well as a CPU 21, ROM 22, RAM 23, nonvolatile RAM 24, a GPS circuit 25, and an A/D converter 26, which are mutually connected via a bus.

The CPU 21 executes various programs stored in the ROM 22 while utilizing the temporary storage function of the RAM 23. In addition to the various programs, the ROM 22 stores a conversion table (see Table 1), which will be described later. The nonvolatile RAM 24 is used as follows. In a state in which the main power source of the cellular phone 10 is on, data are written in the nonvolatile RAM 24 in accordance with an instruction from the CPU 21. The nonvolatile RAM 24 stores or holds the written data even after the main power source is turned off. When the main power source is turned on, the nonvolatile RAM 24 supplies the stored data to the CPU 21 in accordance with a request from the CPU 21. The nonvolatile RAM 24 may be replaced with an EEPROM.

The antenna section 12 includes an antenna 12a for transmission and reception; a transmission/reception circuit 12b connected to the antenna 12a; and a modulation/demodulation circuit 12c connected to the transmission/reception circuit 12b. The modulation/demodulation circuit 12c demodulates a signal received by the transmission/reception circuit 12b, and modulates a signal to be transmitted and supplies a resultant signal to the transmission/reception circuit 12b. The antenna section 12 serves as a communication means for enabling communication with the outside, such as an information center. The speaker section 13 includes a speaker 13a, and a sound generation circuit 13b connected to the speaker 13a and adapted to generate a signal for causing the speaker 13a to generate a predetermined sound. The liquid crystal display section 14 includes a liquid crystal display panel 14a disposed on the front face of the main body 11 of the cellular phone 10 and capable of displaying alphabetic information or other information and images produced from various data such as an image of a map, and a display circuit 14b connected to the liquid crystal display panel 14a and adapted to generate a signal for causing the liquid crystal display panel 14a to provide a predetermined display.

The operation section 15 includes a plurality of push buttons 15a disposed on the front face of the main body 11, and a detection circuit 15b connected to the plurality of push buttons 15a and adapted to detect on/off states of the push buttons 15a. Note that an azimuth/inclination angle display mode and an angle calculation mode, which will be described later, are each started in response to operation of a specific button among the plurality of push buttons 15a. The microphone section 16 includes a microphone 16a, and an amplification circuit 16b connected to the microphone 16a and adapted to amplify voice input from the microphone 16a. Of these components, the modulation/demodulation circuit 12c, the sound generation circuit 13b, the display circuit 14b, the detection circuit 15b, and the amplification circuit 16b are controlled by the CPU 21, which is connected to these circuits via the bus.

The GPS circuit 25 serves as a position-data obtaining means and is designed to process GPS signals from unillustrated GPS satellites obtained via an unillustrated antenna, and specifies the position of the cellular phone 10 (i.e., a latitude and a longitude showing the present position) so as to obtain position data representing the specified position. The AD converter 26 is connected to an X-axis magnetic sensor 31 and a Y-axis magnetic sensor 32 of the magnetic sensor unit 30. The AD converter 26 converts analog output values of the X-axis magnetic sensor 31 and the Y-axis magnetic sensor 32 to digital values and supplies the digital values to the CPU 21.

As shown in FIG. 1, the magnetic sensor unit 30 is held within the main body 11 of the cellular phone 10 in parallel to the front face (a plane parallel to the X-Y plane). As shown in FIG. 2, the magnetic sensor unit 30 includes the X-axis magnetic sensor 31, which outputs a value corresponding to a component of an external magnetic field as measured along the direction of the X-axis (the transverse axis of the main body), and the Y-axis magnetic sensor 32, which outputs a value corresponding to a component of the external magnetic field as measured along the direction of Y-axis (the longitudinal axis of the main body).

Figure 3:
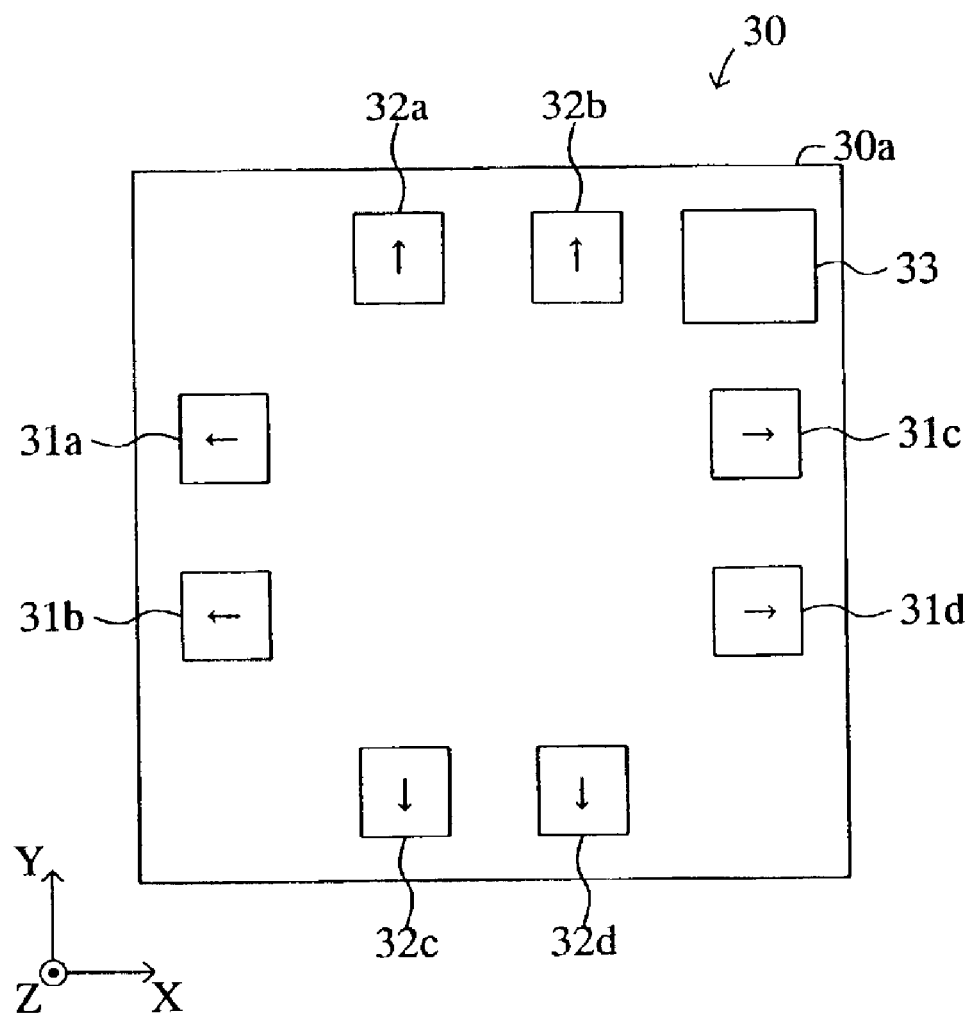
FIG. 3 is a schematic plan view of the magnetic sensor unit shown in FIG. 1.
Figure 4:
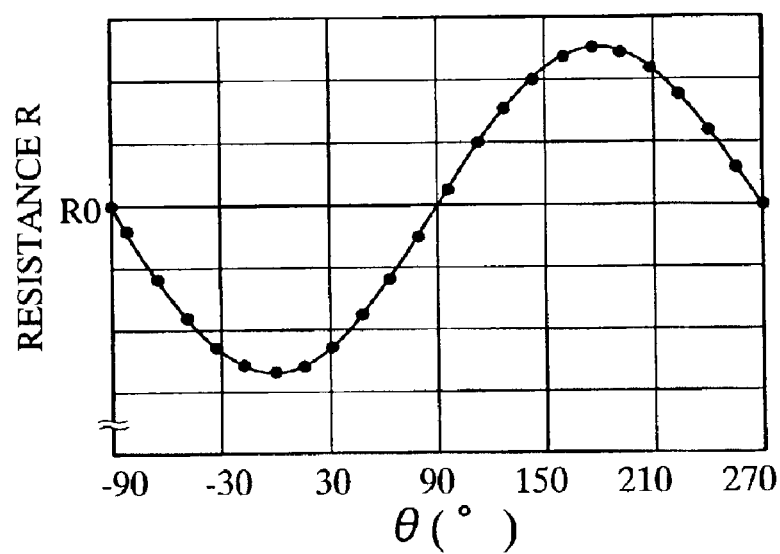
FIG. 4 is a graph showing the characteristics of each of GMRs constituting the magnetic sensors shown in FIG. 3.

Next, the magnetic sensor unit 30 will be described in detail. As shown in FIG. 3, which is a plan view of the magnetic sensor unit 30, the magnetic sensor unit 30 includes a substrate 30a; four GMR elements (giant magneto-resistance effect elements) 31a to 31d formed on the substrate 30a; four GMR elements 32a to 32d formed on the substrate 30; and a control circuit 33. Each of the GMR elements 31a to 31d and 32a to 32d has a well-known film structure having a free layer whose magnetization direction changes in accordance with an external magnetic field; an electrically conductive spacer layer; and a fixed magnetization layer whose magnetization direction is fixed (pinned). As shown in FIG. 4, the resistance R of each GMR element changes in accordance with the angle θ between the magnetization direction of the fixed magnetization layer and the magnetization direction of the free layer. The fixed magnetization directions of the fixed magnetization layers of the GMR elements 31a to 31d and 32a to 32d are indicated by arrows in FIG. 3.

Figure 5:
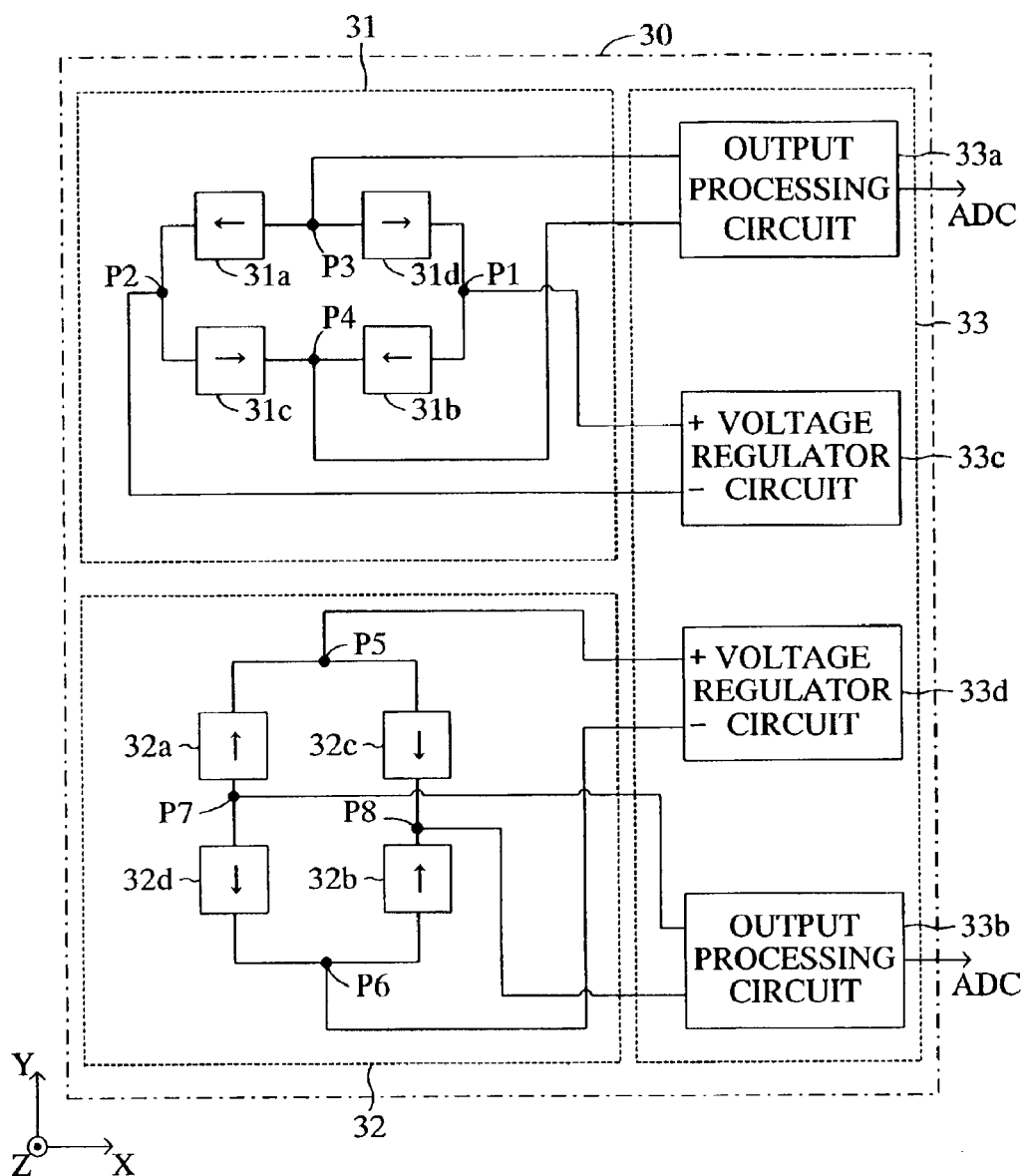
FIG. 5 is an equivalent circuit diagram of the magnetic sensor unit shown in FIG. 1.

FIG. 5 shows an equivalent circuit of the magnetic sensor unit 30. In FIG. 5 as well, the fixed magnetization directions of the fixed magnetization layers of the GMR elements 31a to 31d and 32a to 32d are indicated by arrows depicted in corresponding blocks which represent the respective elements. As shown in FIG. 5, the above-described control circuit 33 includes output processing circuits 33a and 33b and voltage regulator circuits 33c and 33d.

Figure 6A:
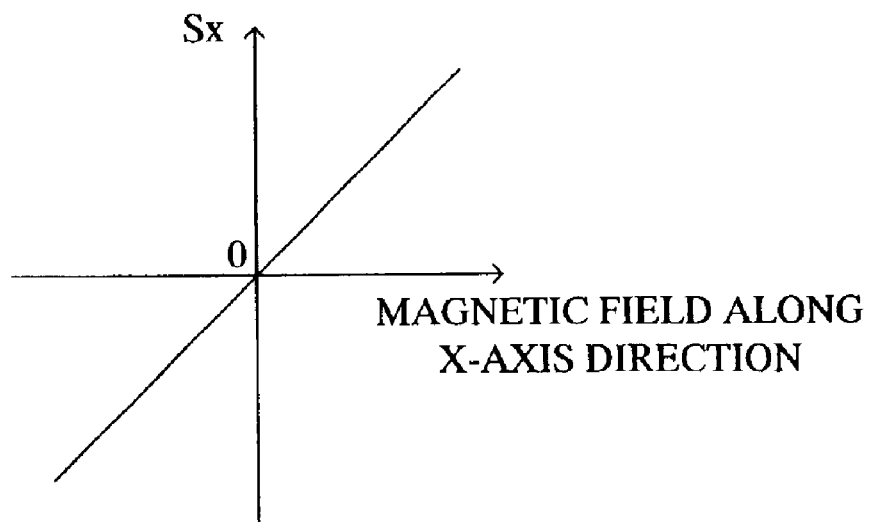
FIG. 6A is a graph showing the output characteristics of the X-axis magnetic sensor shown in FIG. 5.

In the X-axis magnetic sensor 31, the GMR elements 31a to 31d are mutually connected to form a full bridge circuit. A connection node P1 between the GMR elements 31d and 31b is connected to a positive output terminal of the voltage regulator circuit 33c, while a connection node P2 between the GMR elements 31a and 31c is connected to a negative output terminal of the voltage regulator circuit 33c, whereby a predetermined voltage is applied between the connection nodes P1 and P2. Further, a connection node P3 between the GMR elements 31a and 31d and a connection node P4 between the GMR elements 31b and 31c are connected to the output processing circuit 33a. The output processing circuit 33a receives a potential difference Vx between the connection nodes P3 and P4, normalizes the potential difference Vx, and outputs the normalized value to the A/D converter 26 as an output Sx of the X-axis magnetic sensor 31. By virtue of the above-described configuration, as shown in FIG. 6A, the output Sx of the X-axis magnetic sensor 31 assumes a value corresponding to (substantially proportional to) the X-axis component of an external magnetic field.

Figure 6B:
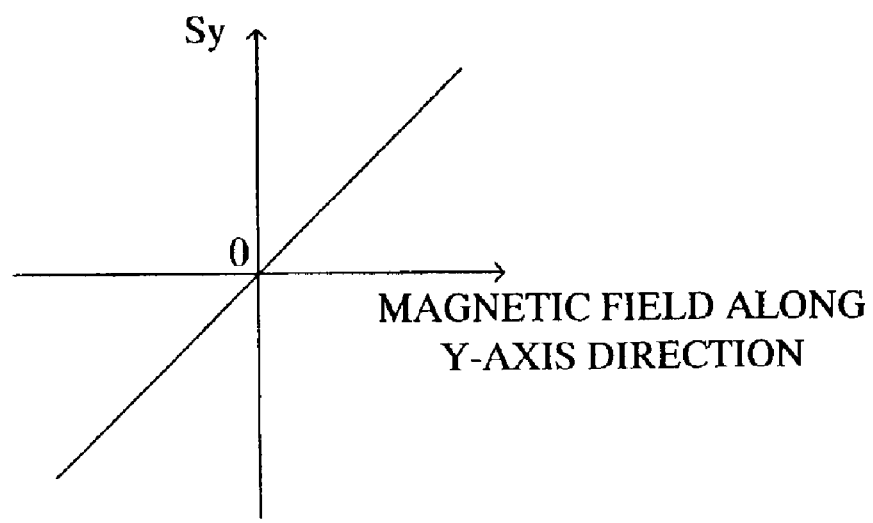
FIG. 6B is a graph showing the output characteristics of the Y-axis magnetic sensor shown in FIG. 5.

In the Y-axis magnetic sensor 32, the GMR elements 32a and 32d are mutually connected to form a full bridge circuit as in the case of the X-axis magnetic sensor 31. A connection node P5 between the GMR elements 32a and 32c is connected to a positive output terminal of the voltage regulator circuit 33d, while a connection node P6 between the GMR elements 32b and 32d is connected to a negative output terminal of the voltage regulator circuit 33d, whereby a predetermined voltage is applied between the connection nodes P5 and P6. Further, a connection node P7 between the GMR elements 32a and 32d and a connection node P8 between the GMR elements 32c and 32b are connected to the output processing circuit 33b. The output processing circuit 33b receives a potential difference Vy between the connection nodes P7 and P8, normalizes the potential difference Vy, and outputs the normalized value to the A/D converter 26 as an output Sy of the Y-axis magnetic sensor 32. By virtue of the above-described configuration, as shown in FIG. 6B, the output Sy of the Y-axis magnetic sensor 32 assumes a value corresponding to (substantially proportional to) the Y-axis component of the external magnetic field.

Notably, the above-described normalization refers to adjustment of the outputs Sx and Sy in such a manner that when a magnetic field having a strength of 1 Oe in the positive X-axis direction is applied to the main body 11, the output Sx becomes "1" and the output Sy becomes "0"; when a magnetic field having a strength of 1 Oe in the negative X-axis direction is applied to the main body 11, the output Sx becomes "−1" and the output Sy becomes "0"; when a magnetic field having a strength of 1 Oe in the positive Y-axis direction is applied to the main body 11, the output Sx becomes "0" and the output Sy becomes "1"; and when a magnetic field having a strength of 1 Oe in the negative Y-axis direction is applied to the main body 11, the output Sx becomes "0" and the output Sy becomes "−1."

Such normalization can be achieved by, for example, a process in which an actual output Sx (or Sy) of the X-axis magnetic sensor 31 (or the Y-axis magnetic sensor 32) at the time when the front face (X-Y) of the cellular phone 10 is parallel to a horizontal plane is divided by a half (SA/2) of the difference SA between maximum and minimum outputs Sx (or Sy) obtained through 360° rotation of the cellular phone 10 with its front face being maintained parallel to the horizontal plane; and a resultant value is multiplied by an absolute value (unit: Oe) of a horizontal-plane component of the local geomagnetic field at a location where the cellular phone 10 is present. When the cellular phone 10 is used within a limited region, the absolute value of the horizontal-plane component of the geomagnetic field at a location where the cellular phone 10 is present can be stored in advance in the ROM 22 or the nonvolatile RAM 24. Alternatively, the cellular phone 10 may be configured to transmit to, for example, an information center data (position data) representing the position of the cellular phone 10 determined by the GPS circuit 25 and receive from the information center the absolute value of the horizontal-plane component of the geomagnetic field at that location, to thereby obtain the absolute value of the horizontal-plane component of the geomagnetic field at the location where the cellular phone 10 is present.

In the above-described example, analog values obtained through normalization of the potential differences Vx and Vy are converted to digital values by means of the A/D converter 26 so as to obtain the outputs Sx and Sy. However, the cellular phone 10 may be configured in such a manner that the potential differences Vx and Vy are converted to digital values by means of the A/D converter 26, and the digital values are normalized so as to obtain the outputs Sx and Sy.

Next, there will be described operation of the cellular phone 10 having the above-described configuration when the cellular phone 10 obtains the azimuth α (deg) of the positive Y-axis direction of the cellular phone 10 and the inclination angle β (deg) of the Y-axis with respect to a horizontal plane. Note that the azimuth α is defined in such a manner that when an upward direction along the longitudinal axis (the positive Y-axis direction) faces the south, α becomes 0 or 360 (deg); when the upward direction faces the west, α becomes 90 (deg); when the upward direction faces the north, α becomes 180 (deg); and when the upward direction faces the east, α becomes 270 (deg).

When the cellular phone 10 is rotated in a horizontal plane while its front face is maintained parallel to the horizontal plane, the output Sx of the X-axis magnetic sensor 31 changes sinusoidally and the output Sy of the Y-axis magnetic sensor 32 changes sinusoidally with a phase difference of 90° with respect to the output Sx. Accordingly, as shown by a solid line in FIG. 7, the locus of the outputs Sx and Sy assumes a substantially circular shape centered at the origin. However, since the geomagnetic field is not horizontal and inclines from the horizontal plane at an angle corresponding to a location on the earth, when the cellular phone 10 is inclined by an inclination angle β from the horizontal plane, the angle formed between the direction of the local geomagnetic field and the positive Y-axis direction of the cellular phone 10 changes, the output Sy reflects the influence thereof.

Figure 7:
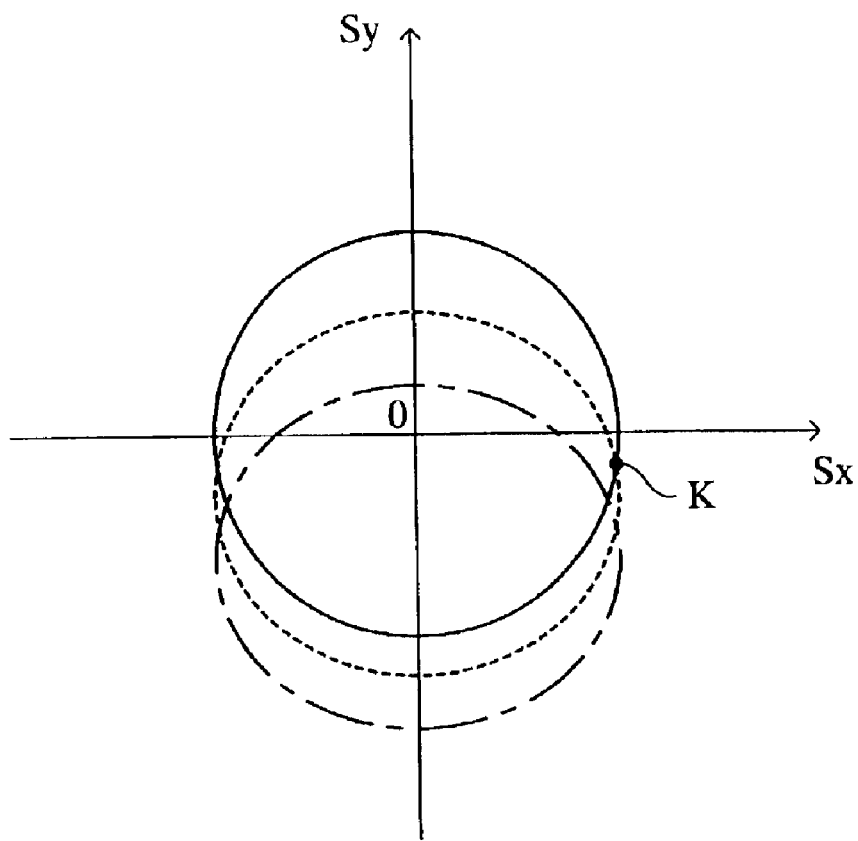
FIG. 7 is a graph showing changes in output values of the magnetic sensor unit shown in FIG. 1 when the cellular phone shown in FIG. 1 is rotated.
Figure 8:
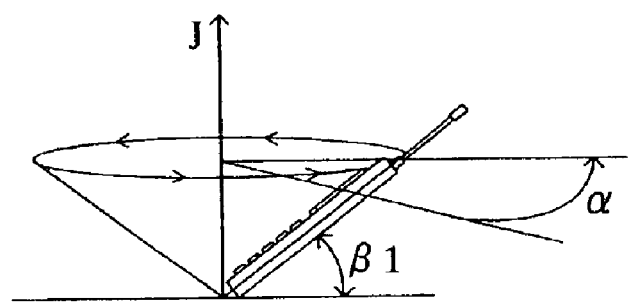
FIG. 8 is an illustration showing movement of the cellular phone which causes the changes in output values shown in FIG. 7.

That is, when, as shown in FIG. 8, the cellular phone 10 is rotated about a vertical axis J while being inclined by an inclination angle β1 with respect to the horizontal plane, the locus of the outputs Sx and Sy assumes the shape of an ellipse as indicated by a broken line in FIG. 7, and its center shifts toward the negative direction along the axis for the output Sy. Moreover, when the cellular phone 10 is rotated about the vertical axis J while being inclined by an inclination angle β2 greater than the inclination angle β1, the locus of the outputs Sx and Sy assumes the shape of an ellipse having a shorter minor axis, as indicated by a chain line in FIG. 8, and its center shifts further toward the negative direction along the axis for the output Sy.

In other words, when the angle of the local geomagnetic field relative to the horizontal plane is constant; i.e., when the cellular phone 10 is located at the same location (latitude and longitude), the values (Sy, Sy) of the outputs Sx and Sy depict a constant known locus, thereby enabling determination of azimuth α and inclination angle β from the values (Sx, Sy). In the present embodiment, the relation between values (Sx, Sy) and values of azimuth α and inclination angle β is determined in advance on the assumption that the cellular phone 10 is located within an area in which the inclination of the geomagnetic field is substantially constant; and a conversion table defining the relation is prepared and stored in the ROM 22. An actual azimuth α and an actual inclination angle β are determined from actual output values (Sx, Sy) with reference to the conversion table stored in the ROM 22. As is apparent from above, the conversion table can be considered to be a table which stores, in a readable form, a relation between the output values Sx, Sy of the first-axis and second-axis magnetic sensors and values of azimuth α and/or inclination angle β, the relation being determined on the assumption that the cellular phone 10 is located within an area in which the inclination of the geomagnetic field is substantially constant.

Notably, in some cases; e.g., at point K in FIG. 7, two or more sets of values (α, β) of azimuth α and inclination angle β may be determined from the single set of output values (Sx, Sy). In such a case, a plurality of sets of values (α, β) of azimuth α and inclination angle β which will result in generation of that set of output values (Sx, Sy) are obtained within an assumed range of use of the cellular phone 10; and average values of the plurality of sets of values (α, β) are employed as values of the conversion table. An example of the assumed range of use condition of the cellular phone 10 is such that the azimuth α falls within a range of 0 to 360 (deg), and the inclination angle β falls within a range of 0 to 45 (deg). Table 1 shows an example of the conversion table obtained in the above-described manner. Notably, in the present embodiment, the rotational angle γ of the cellular phone 10 (the main body 11) about the longitudinal axis (Y-axis) is assumed to be zero; however, the present embodiment may be modified in such a manner that the rotational angle γ is changed within a predetermined angular range; the relation between the output values (Sx, Sy) and sets of values (α, β) of azimuth α and inclination angle β is obtained at a different rotational angle γ; and the thus-obtained plurality of relations are averaged to thereby obtain the values of the conversion tables.

TABLE 1

| Sx | Sy | Azimuth α (deg) | Inclination angle β (deg) |
|---|---|---|---|
| −0.35 | 0.08 | 256 | 1 |
| −0.35 | 0.06 | 257 | 1 |
| −0.35 | 0.05 | 259 | 3 |
| −0.35 | 0.03 | 260 | 4 |
| −0.35 | 0.02 | 262 | 5 |
| −0.35 | 0.00 | 264 | 6 |
| . | . | . | . |
| . | . | . | . |
| . | . | . | . |
| −0.35 | −0.17 | 270 | 33 |
| −0.35 | −0.18 | 270 | 36 |
| −0.33 | 0.12 | 247 | 0 |
| −0.33 | 0.11 | 248 | 1 |
| . | . | . | . |
| . | . | . | . |
| −0.33 | −0.23 | 278 | 39 |
| −0.33 | −0.24 | 279 | 42 |
| −0.32 | 0.15 | 240 | 0 |
| −0.32 | 0.14 | 242 | 1 |
| . | . | . | . |
| . | . | . | . |
| 0.00 | −0.41 | 360 | 28 |
| 0.00 | −0.42 | 360 | 38 |
| 0.02 | 0.30 | 178 | 0 |
| 0.02 | 0.29 | 177 | 2 |
| . | . | . | . |
| . | . | . | . |
| 0.33 | −0.23 | 82 | 39 |
| 0.33 | −0.24 | 81 | 42 |
| 0.35 | 0.08 | 105 | 1 |
| 0.35 | 0.06 | 103 | 1 |
| . | . | . | . |
| . | . | . | . |
| 0.35 | −0.17 | 90 | 33 |
| 0.35 | −0.18 | 90 | 36 |

Next, actual operation of the cellular phone 10 will be described, starting from the case where the cellular phone 10 has entered an azimuth/inclination angle display mode through operation of a specific button among the plurality of push buttons 15a, but has not entered an angular change calculation mode.

Figure 9:
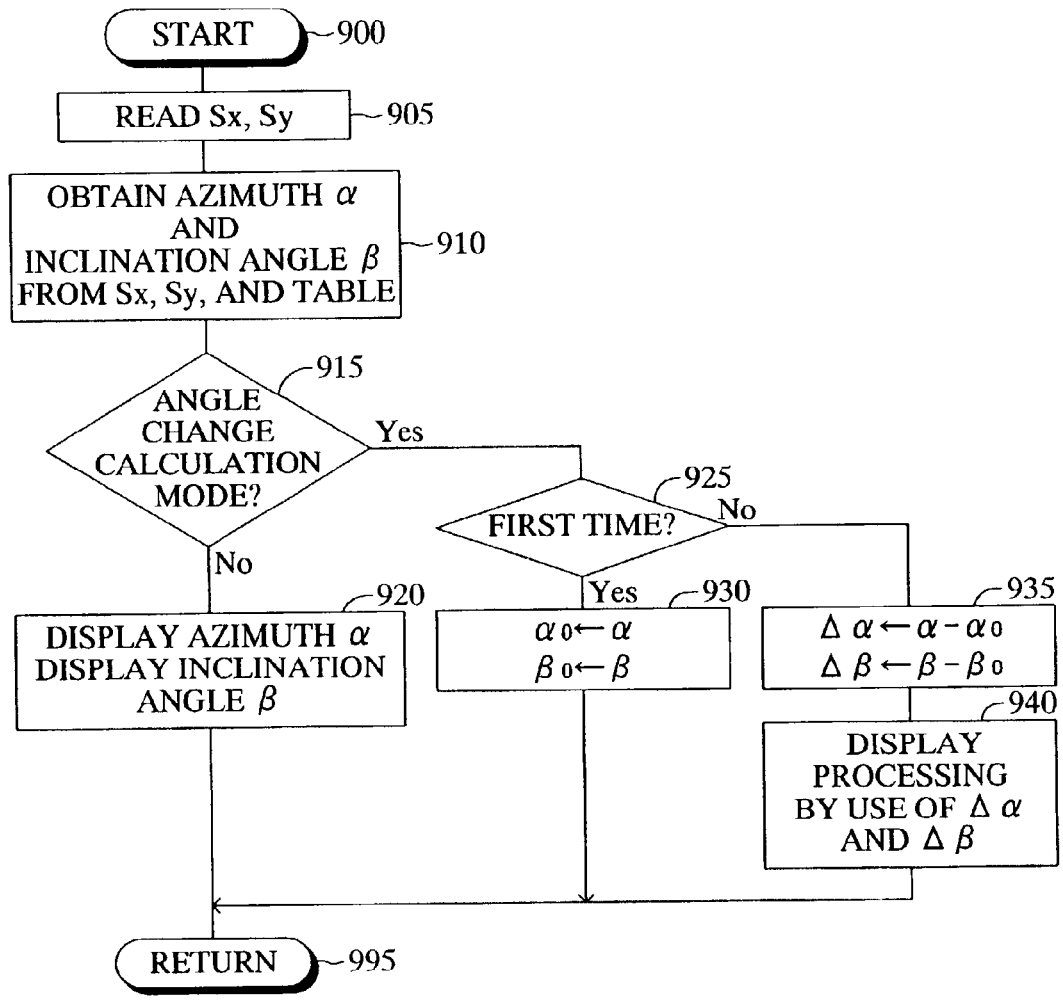
FIG. 9 is a flowchart showing a program (routine) executed by the CPU shown in FIG. 2.

The CPU 21 of the cellular phone 10 repeatedly executes a routine (program) shown in FIG. 9 at predetermined time intervals. Therefore, when a predetermined timing has come, the CPU 21 starts the processing of this routine from step 900, and proceeds to step 905 in order to read the output Sx of the X-axis magnetic sensor 31 and the output Sy of the Y-axis magnetic sensor 32.

Subsequently, the CPU 21 proceeds to step 910 in order to read the conversion table shown in the above-described Table 1 from the ROM 22 and obtain an actual azimuth α and an actual inclination angle β on the basis of the read outputs Sx and Sy with reference to the read conversion table. For example, when the outputs Sx and Sy are −0.35 and 0.08, respectively, the azimuth α is obtained to be 256 (deg), and the inclination angle β is obtained to be 1 (deg). Notably, step 910 serves as an azimuth determination means, an inclination angle determination means, and an azimuth/inclination angle determination means.

Subsequently, the CPU 21 proceeds to step 915 in order to determine whether the current mode is the angular change calculation mode. At the present stage, the cellular phone 10 has not entered the angular change calculation mode and remains in the azimuth/inclination angle display mode. Therefore, the result of the determination by the CPU 21 in step 915 becomes "No," and the CPU 21 proceeds to step 920. In step 920, the CPU 21 displays the azimuth α and inclination angle β obtained in step 910 on the liquid crystal display panel 14a in the form of numerical values and/or a graphical image. Subsequently, the CPU 21 proceeds to step 995 in order to end the present routine.

Figure 10A:
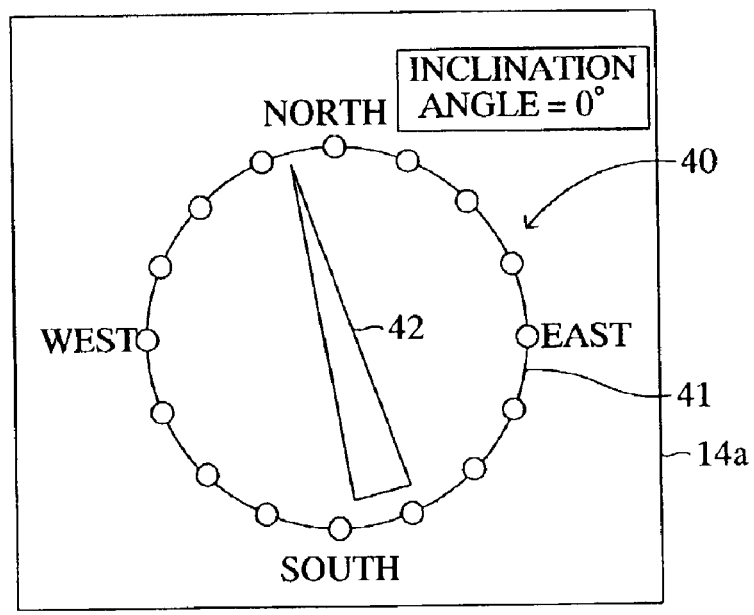
FIG. 10A is an illustration schematically showing an image of an azimuth compass displayed on a display panel when the cellular phone is held horizontally.
Figure 10B:
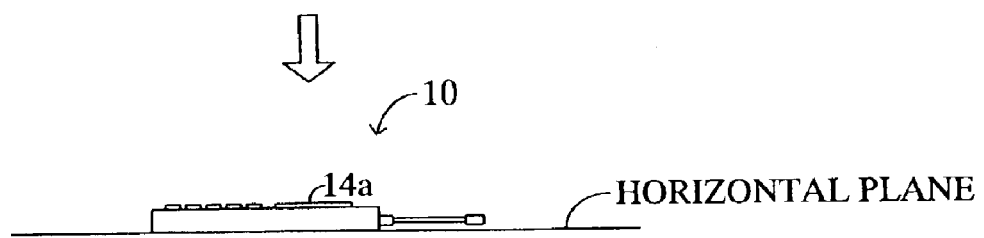
FIG. 10B is a side view of the cellular phone showing the posture of the cellular phone when the display of FIG. 10A is provided, with an arrow indicating the direction along which the user views the cellular phone.

Here, specific examples of the display provided in step 920 will be described with reference to FIGS. 10A, 10B, 11A, and 11B. FIG. 10A shows an example manner of displaying azimuth when the front face (X-Y plane) of the cellular phone 10 is parallel to a horizontal plane as shown in FIG. 10B (i.e., the inclination angle β is a predetermined angle of "0" degree). In this example, a predetermined image resembling an azimuth compass 40 is displayed on the display panel 14a. The azimuth compass 40 includes a peripheral circle portion 41 and a magnetic needle 42 disposed within the circle portion 41. The magnetic needle 42 is rotated in accordance with the obtained azimuth α so as to indicate the azimuth α. As shown in FIG. 10A, the circle portion 41 is depicted as a true circle when the inclination angle β is "0" degree.

Figure 11A:
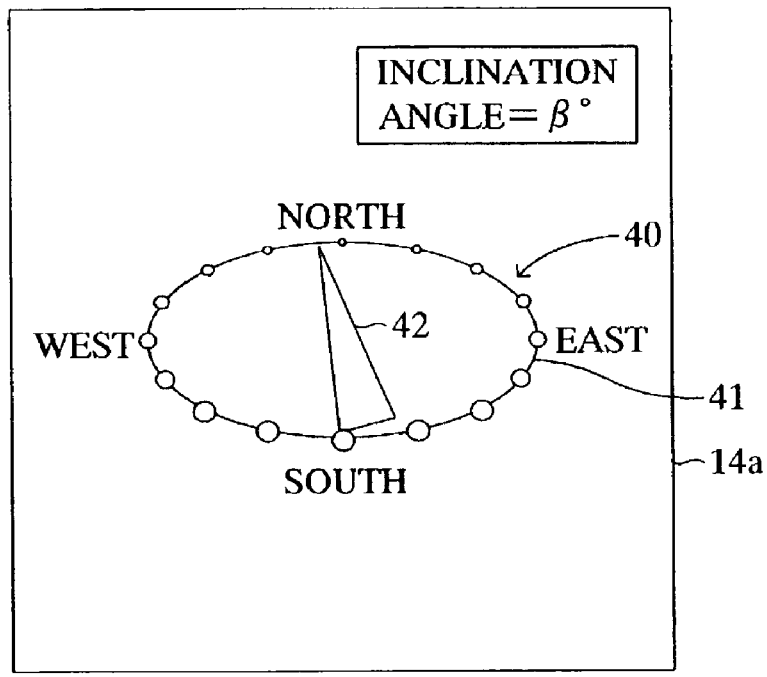
FIG. 11A is an illustration schematically showing an image of an azimuth compass displayed on the display panel when the cellular phone is inclined by an inclination angle β from a horizontal plane.
Figure 11B:
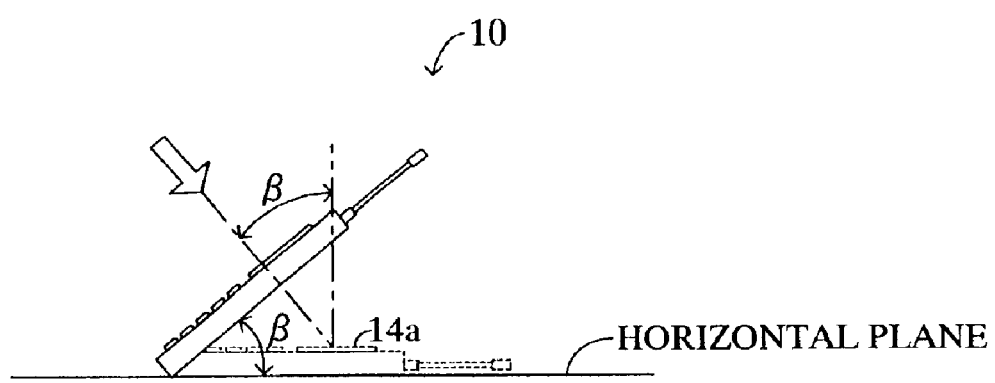
FIG. 11B is a side view of the cellular phone showing the posture of the cellular phone when the display of FIG. 11A is provided, with an arrow indicating the direction along which the user views the cellular phone.

FIG. 11A shows an example manner of displaying azimuth when the longitudinal axis (Y-axis) of the cellular phone 10 is inclined by an angle β from the horizontal plane as shown in FIG. 11B. As is understood from FIG. 11A, when the longitudinal axis of the cellular phone 10 is inclined by an angle β from the horizontal plane, the circle portion 41 of the azimuth compass 40 is formed in the shape of an ellipse whose minor axis coincides with the longitudinal axis. More specifically, when the longitudinal axis of the cellular phone 10 is inclined by an angle β from the horizontal plane, the azimuth compass 40 is displayed as if the azimuth compass 40, which is displayed on the display panel 14a of the cellular phone 10 disposed in such a manner that the front face (the longitudinal direction) of the main body 11 becomes parallel to a horizontal plane (as indicated by a broken line in FIG. 11B), were viewed from a direction inclined by the angle β from a line normal to the front face (the display panel 14a) of the cellular phone 10.

As described above, the cellular phone 10 includes azimuth display means which displays azimuth α by means of an image of the predetermined azimuth compass 40 when the inclination angle β of the cellular phone 10 is zero and which shortens the length of the magnetic needle 42 and the dimension of the azimuth compass 40 along the longitudinal direction as the inclination angle β increases (that is, the azimuth α is displayed while the image of the azimuth compass 40 is distorted to a degree that increases with inclination angle β). Therefore, a user encounters difficulty in determining (visually recognizing) the azimuth when increasing the inclination angle β. As a result, the azimuth display means encourages the user to use the cellular phone 10 in parallel to the horizontal plane to a possible extent.

Notably, when a map of an area in which the cellular phone 10 is present is displayed on the display panel 14a, the manner of displaying the map may be changed in accordance with the inclination angle β as in the case of the above-described azimuth compass 40. Moreover, as shown in FIGS. 10A and 11A, the absolute value of an inclination angle may be provided in the displayed image in the form of a numerical value. As is apparent from the above, the above-described step 920 realizes the function of the azimuth display means.

Next, operation of the cellular phone 10 will be described for the case in which the operation mode has been switched to the angular change calculation mode in response to a user's operation of the above-described specific button of the cellular phone 10. In this case as well, the CPU 21 starts the above-described processing from step 900 at a predetermined timing, and executes steps 905 and 910 to thereby obtain an azimuth α and an inclination angle β at the present time in the same manner as described above. Subsequently, the CPU 21 proceeds to step 915.

In this case, the mode of the cellular phone 10 has been switched to the angular change calculation mode. Accordingly, the result of the determination by the CPU 21 in step 915 becomes "Yes," and the CPU 21 proceeds to step 925. In step 925, the CPU 21 determines whether the present routine is being executed for the first time after the operation mode has been switched to the angular change calculation mode. At the present stage, the present routine is being executed for the first time after the operation mode has been switched to the angular change calculation mode. Therefore, the result of the determination by the CPU 21 in step 925 becomes "Yes," and the CPU 21 proceeds to step 930 in order to store as a reference azimuth $\alpha_0$ the azimuth α at the present time obtained in step 910, and store as a reference inclination angle $\beta_0$ the inclination angle β at the present time obtained in step 910.

When this state continues, the CPU 21 again starts the processing of the present routine from step 900, and executes steps 905 and 910 to thereby obtain an azimuth α and an inclination angle β at the present time. In this case as well, the result of the determination by the CPU 21 in step 915 becomes "Yes," and therefore, the CPU 21 proceeds to step 925. At the present stage, the present routine has already been executed after the operation mode has been switched to the angular change calculation mode. Therefore, the result of the determination by the CPU 21 in step 925 becomes "No," and the CPU 21 proceeds to step 935. In step 935, the CPU 21 stores as an azimuth angle change (lateral rotation change angle) Δα a value obtained by subtracting the stored reference azimuth $\alpha_0$ from the azimuth α at the present time, and stores as an inclination angle change (vertical rotation change angle) Δβ a value obtained by subtracting the stored reference inclination angle $\beta_0$ from the inclination angle β at the present time. Subsequently, the CPU 21 proceeds to step 940 in order to perform display processing by use of the stored azimuth angle change Δα and the stored inclination angle change Δβ, and then proceeds to step 995 to thereby end the present routine.

The display processing executed in the above-described step 940 by use of the stored azimuth angle change Δα and the stored inclination angle change $\Delta\beta$ includes displaying the azimuth angle change $\Delta\alpha$ and the inclination angle change $\Delta\beta$ on the display panel 14a in the form of numerical values and/or a graphical image, moving a cursor on the display panel 14a in the X-axis and Y-axis directions, respectively, by an amount, or at a speed, in accordance with the azimuth angle change $\Delta\alpha$ and the inclination angle change $\Delta\beta$, scrolling a map or other image on the display panel 14a in accordance with the azimuth angle change $\Delta\alpha$ and the inclination angle change $\Delta\beta$, and controlling a game displayed on the display panel 14a in accordance with the azimuth angle change $\Delta\alpha$ and the inclination angle change $\Delta\beta$.

As described above, the azimuth angle change $\Delta\alpha$ and the inclination angle change $\Delta\beta$ are determined on the basis-of the azimuth angle $\alpha$ and the inclination angle $\beta$ determined in step 910. Therefore, the above-described step 940 constitutes a display control means for changing a screen, which is displayed on the display section (the liquid crystal display section 14) on the basis of various data, in accordance with the determined inclination angle and azimuth.

The processing in step 940 may be modified in such a manner that the sound volume of an incoming call melody (melodious ringing tone) and an associated tone color vary in accordance with the azimuth angle change $\Delta\alpha$ and the inclination angle change $\Delta\beta$. In this case, the above-described step 940 constitutes an incoming call melody control means (sound control means) for controlling an incoming call melody in accordance with the determined inclination angle and azimuth.

As described above, in the present embodiment, a conversion table which defines the relation between output values (Sx, Sy) of the magnetic sensor unit 30 and values of azimuth $\alpha$ and inclination angle $\beta$ is prepared; and actual azimuth $\alpha$ and inclination angle $\beta$ are obtained from actually obtained output values (Sx, Sy) and with reference to the conversion table. Therefore, even when the longitudinal axis of the cellular phone 10 is inclined with respect to a horizontal plane, the cellular phone 10 can obtain the actual azimuth $\alpha$ and inclination angle $\beta$ accurately.

Moreover, in the angle change calculation mode, change amounts ($\Delta\alpha$, $\Delta\beta$) of the azimuth $\alpha$ and the inclination angle $\beta$ can be obtained. Therefore, when the cellular phone 10 is rotated about a vertical axis (the above-described J-axis) or the longitudinal axis of the cellular phone 10 is rotated about an axis in a horizontal plane, the rotation change amounts $\Delta\alpha$ and $\Delta\beta$ are detected, and various functions on the basis of the rotation change amounts $\Delta\alpha$ and $\Delta\beta$ can be imparted to the cellular phone 10.

Note that, in this sense, in the above-described embodiment, a longitudinal axis in the state of use and a transverse axis perpendicular to the longitudinal axis are defined for the main body of the apparatus (the cellular phone 10), the first axis corresponding to the transverse axis, and the second and third axes corresponding to the longitudinal axis, and the electronic apparatus further comprises longitudinal-axis change angle calculation means for saving as a reference inclination angle $\beta_0$ the inclination angle $\beta$ determined by the azimuth-inclination angle determination means when the operation mode is switched to the angular change calculation mode, and for calculating a change $\Delta\beta$ in the inclination angle of the longitudinal axis from the reference inclination angle $\beta_0$ on the basis of the reference inclination angle $\beta_0$ and an inclination angle $\beta$ presently determined by the azimuth-inclination angle determination means.

In the above-described embodiment, a single conversion table is stored in the ROM 22. However, the embodiment may be modified in such a manner that a similar conversion table is prepared for each of different locations (at which the cellular phone 10 may be used and at which the geomagnetic field has different inclination angles) and is stored in the ROM 22, and a proper conversion table is read out in accordance with the position of the cellular phone 10 obtained by means of the GPS circuit 25. Further, the cellular phone 10 may be configured to obtain (values of) a conversion table from a remote information center, or the like, via communication means. This can reduce the storage capacity of the ROM 22.

Moreover, in this case, the cellular phone 10 may be configured to transmit the obtained position data to the information center (server) via a communication means and obtain (values of) a conversion table corresponding to the specified position. By virtue of this configuration, the azimuth $\alpha$ and the inclination angle $\beta$ can be obtained accurately even when the inclination of the geomagnetic field with respect to a horizontal plane changes due to use of the cellular phone 10 over a wide area.

In this case, the information center may be configured to transmit to the cellular phone 10 either table values with inclination correction or table values without inclination correction in accordance with the position of the cellular phone 10. The table values with inclination correction refer to values of a table which defines the relation among outputs Sx, Sy, azimuth $\alpha$, and inclination angle $\beta$, like the above-described Table 1. The table values without inclination correction refer to values of a table which defines the relation between outputs Sx, Sy and values of azimuth $\alpha$ determined on the assumption that the inclination angle $\beta$ is a predetermined constant angle (e.g., "0" degree). Next, a modification which uses the above-described two types of tables will be described with reference to FIGS. 12 and 13.

Figure 12:
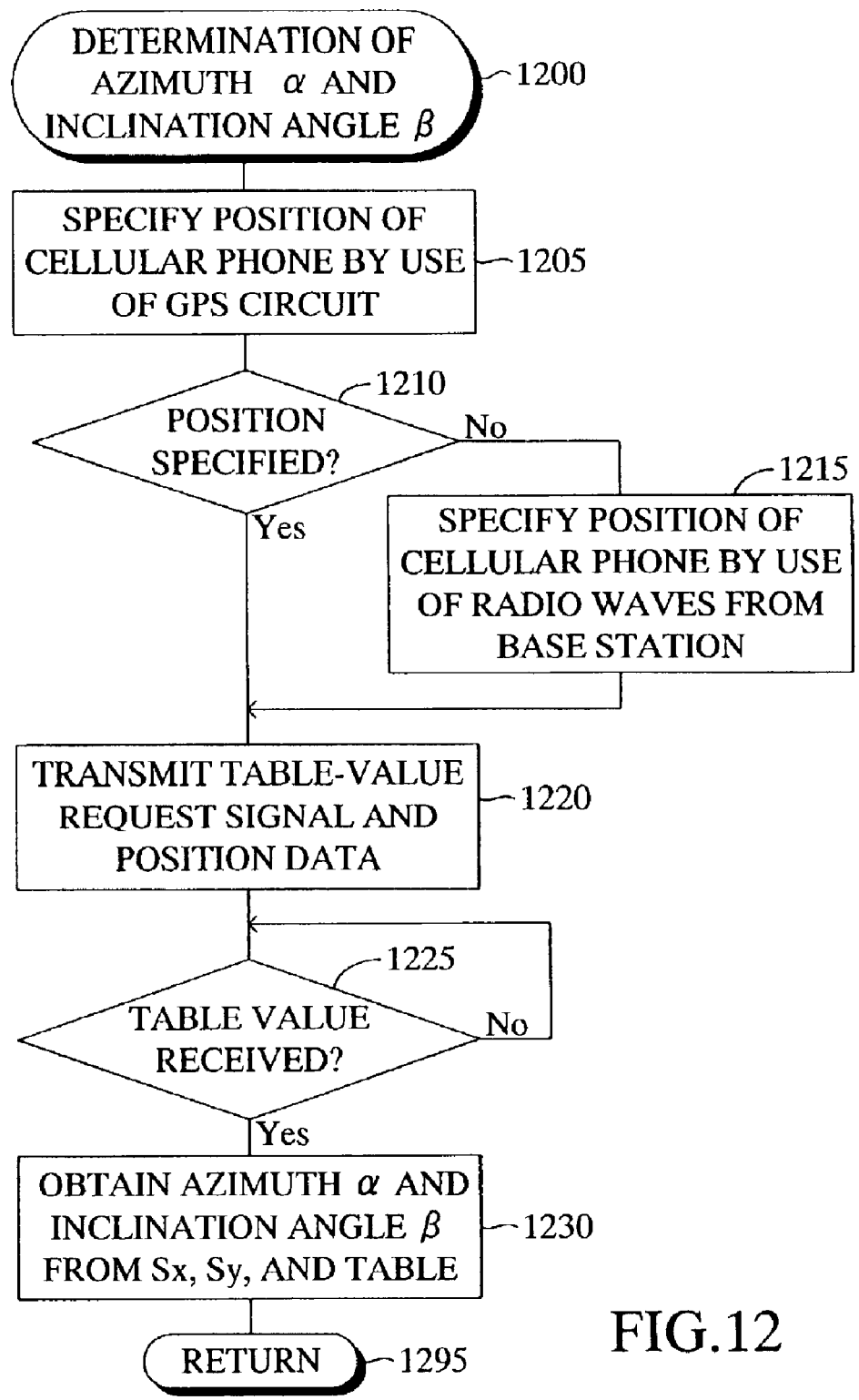
FIG. 12 is a flowchart relating to a modification of the embodiment of the present invention and showing a program (routine) executed by the CPU of a cellular phone.

In this modification, in step 910 shown in FIG. 9, the CPU 21 executes a program shown in FIG. 12 in the form of a flowchart. Specifically, after having read the output values Sx and Sy in step 905 of FIG. 9, the CPU 21 proceeds to step 1205 via step 1200. In step 1205, the CPU 21 tries to calculate (specify) the position of the cellular phone 10 by means of the GPS circuit 25. Subsequently, the CPU 21 proceeds to step 1210 in order to determine whether or not the position has been specified in step 1205. When the position has been specified, the result of the determination by the CPU 21 in step 1210 becomes "Yes," and the CPU 21 proceeds to step 1220. By contrast, when the position has not been specified in step 1205, the result of the determination by the CPU 21 in step 1210 becomes "No," and the CPU 21 proceeds to step 1215. In step 1215, the CPU 21 specifies the position of the cellular phone 10 on the basis of radio waves from a base station (cellular phone base station). Subsequently, the CPU 21 proceeds to step 1220.

In step 1220, the CPU 21 transmits to an information center (server) a table-value request signal and data (position data) regarding the above-described specified position. In subsequent step 1225, the CPU 21 determines through monitoring whether table values have been transmitted from the information center (whether the CPU 21 has received table values).

Figure 13:
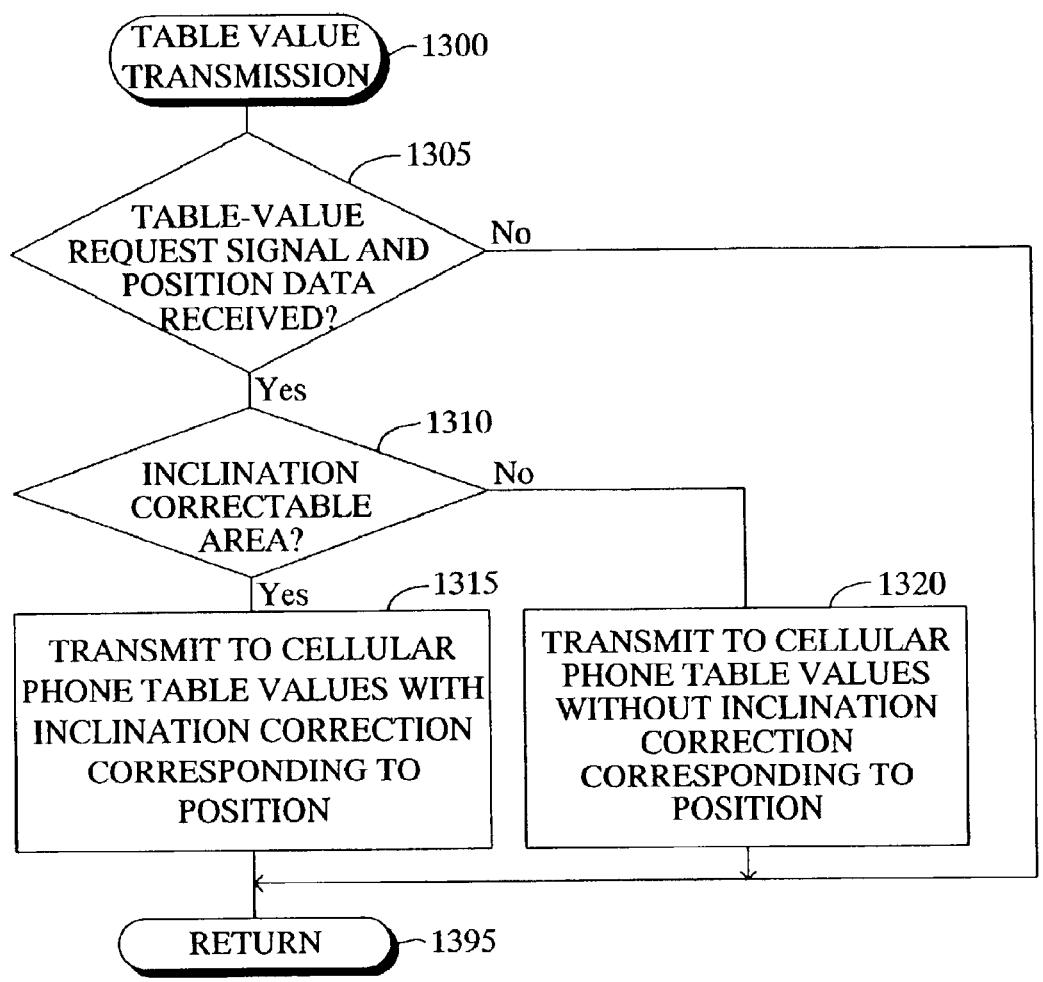
FIG. 13 is a flowchart relating to the modification of the embodiment of the present invention and showing a program (routine) executed by a server at a center.

Meanwhile, the server of the information center repeatedly executes at predetermined time intervals a program shown in FIG. 13 in the form of a flowchart. Therefore, when a predetermined timing has come, the server starts the processing from step 1300 and in step 1305 determines whether the server has received from any cellular phone 10 a table-value request signal and position data. When the server has not received a table-value request signal and position data from any cellular phone 10, the result of the determination by the server in step 1305 becomes "No." In this case, the server proceeds to step 1395 in order to end the present routine. As described above, the server performs monitoring in order to determine whether the server has received from any cellular phone 10 a table-value request signal and position data.

Accordingly, when a certain cellular phone 10 executes the above-described step 1220 of FIG. 12 and thus transmits a table-value request signal and position data to the server, the result of the determination by the server in step 1305 becomes "Yes." In this case, the server proceeds to step 1310 in order to determine whether the cellular phone 10 is located within an inclination correctable area, on the basis of the received position data of the cellular phone 10. Here, the inclination correctable area refers to an area in which the geomagnetic field (the geomagnetic field vector) is known. For example, inside a building or underground passage, the geomagnetic field may be weakened or distorted by, for example, shielding. Since the geomagnetic field within such an area is unknown, the area is determined to be outside an inclination correctable area.

When the cellular phone 10 is located within an inclination correctable area, the result of the determination by the server in step 1310 becomes "Yes." In this case, the server proceeds to step 1315 in order to transmit to the cellular phone 10 table values with inclination correction corresponding to the position data (see Table 1). Subsequently, the server ends the present routine in step 1395. When the cellular phone 10 is not located within an inclination correctable area, the result of the determination by the server in step 1310 becomes "No." In this case, the sever proceeds to step 1320 in order to transmit to the cellular phone 10 table values without inclination correction corresponding to the position data, and then proceeds to step 1395 in order to end the present routine. Notably, as described previously, in the table without inclination correction, all the values for inclination angle $\beta$ are set to "0 degree."

As a result of the transmission operation of the server, the cellular phone 10 receives table values, whereby the result of the determination by the CPU 21 in step 1225 becomes "Yes." As a result, the CPU 21 proceeds to step 1230 in order to obtain an actual azimuth $\alpha$ and an actual inclination angle $\beta$ on the basis of the above-described read output values Sx and Sy and with reference to a conversion table containing the received table values. Subsequently, the CPU 21 proceeds to step 915 and subsequent steps in order to display the azimuth $\alpha$ and the inclination angle $\beta$ and perform other processing. By virtue of the above-described operation, when the cellular phone 10 is located within the inclination correctable area, azimuth $\alpha$ and inclination angle $\beta$ can be determined accurately; and when the cellular phone 10 is located outside of the inclination correctable area, an erroneous operation of displaying the inclination angle $\beta$ of 0 degree as if it assumes some magnitude can be prevented.

When the CPU 21 is configured to receive table values from the center, once the CPU 21 has received table values, the CPU 21 desirably omits the performance of steps 1205 to 1225 in step 910 of FIG. 9 until the position of the cellular phone 10 changes. This eliminates repeated reception of the same table values, to thereby avoid useless communications.

Further, the server and the cellular phone 10 may be configured as follows. When the cellular phone 10 is not located within the inclination correctable area, the server transmits to the cellular phone 10 a signal indicating that values for inclination angle $\beta$ must be regarded "0," instead of transmitting to the cellular phone 10 table values without correction. When the cellular phone 10 receives such a signal, the cellular phone 10 obtains an azimuth $\alpha$ by use of the output values Sx and Sy, and trigonometric functions, for example. In this case, the cellular phone 10 may determine the azimuth $\alpha$ by use of the expression $\alpha=180°-\arctan(Sx/Sy)$ when the output value Sy is positive, and by use of the expression $\alpha=\arctan(Sx/Sy)$ when the output value Sy is negative.

Alternatively, the cellular phone 10 may determine the azimuth $\alpha$ by use of the expression $\alpha=180°-\arcsin(Sx/(Sx^2+Sy^2)^{1/2})$ when the output value Sy is positive, and by use of the expression $a=\arcsin(Sx/(Sx^2+Sy^2)^{1/2})$ when the output value Sy is negative.

Next, another embodiment of the electronic apparatus according to the present invention will be described. A cellular phone 10 of the present embodiment differs from that of the above-described embodiment mainly in that the CPU 21 executes a game program stored in the ROM 22 (or stored in the RAM 23 or the nonvolatile RAM 24 via a communication means). Mainly this difference will be described hereinbelow.

Figure 14:
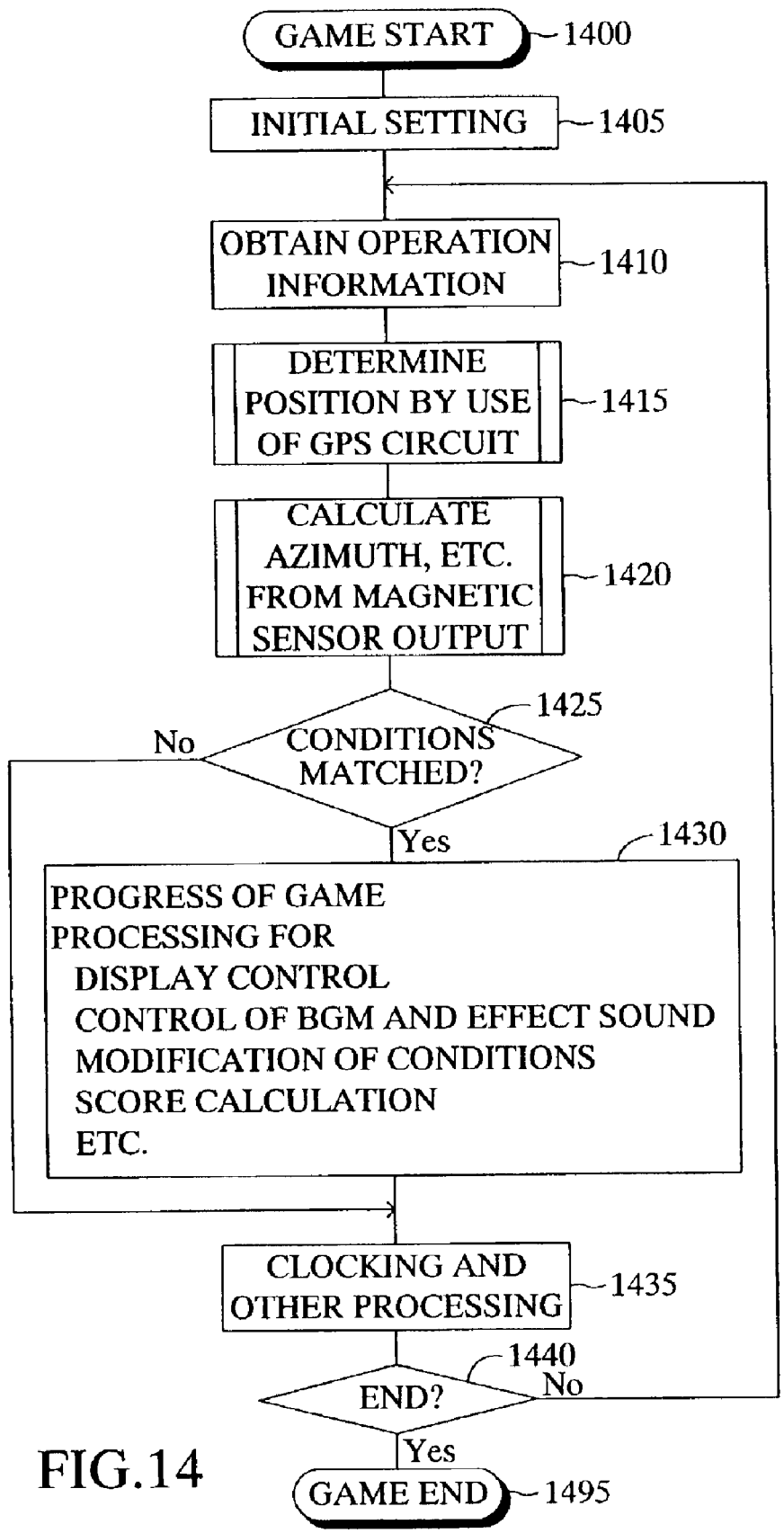
FIG. 14 is a flowchart relating to a second embodiment of the present invention and showing a program (routine) executed by the CPU of a cellular phone in order to provide a game to a user.
Figure 15:
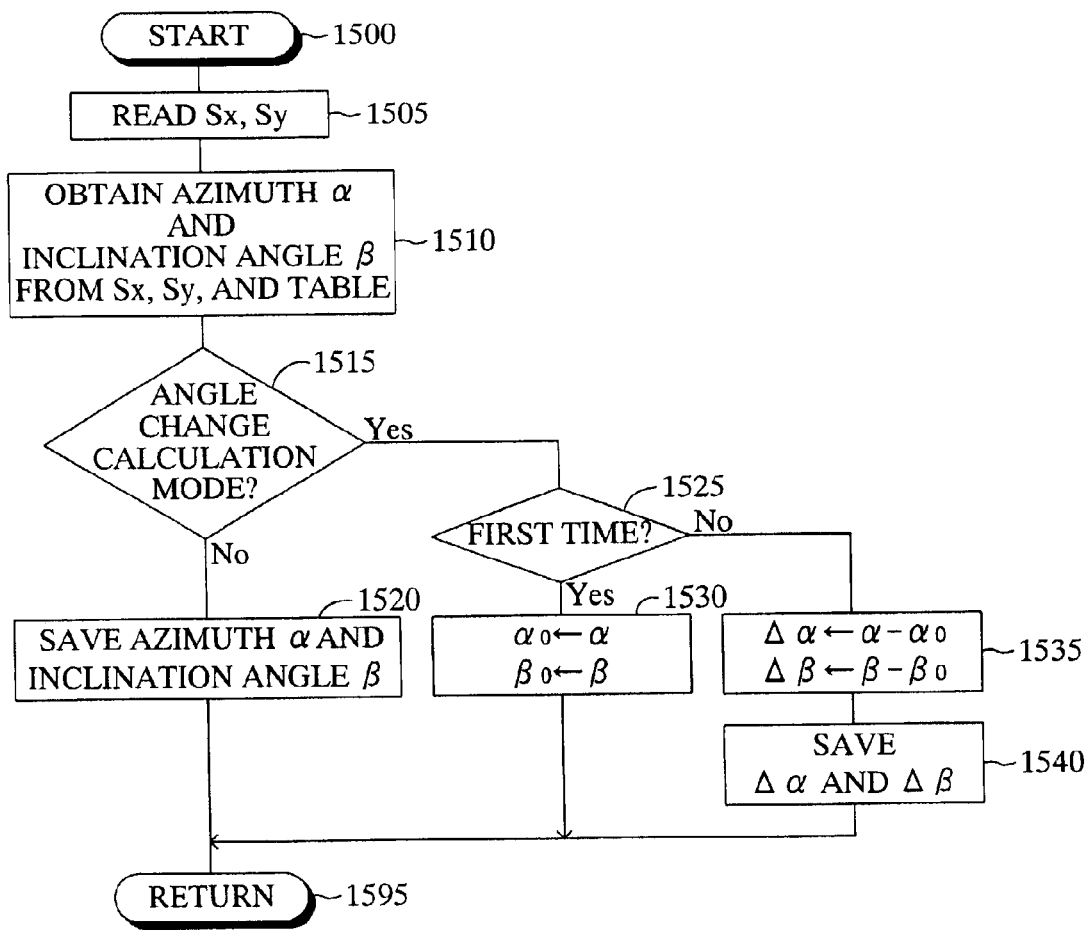
FIG. 15 is a flowchart relating to the second embodiment of the present invention and showing a program (routine) executed by the CPU of the cellular phone in order to provide a game to a user.

The CPU 21 executes a routine (which constitutes a game execution means) shown in FIGS. 14 and 15 to thereby provide a game whose progress changes in accordance with the azimuth and inclination angle of the cellular phone 10. When execution of the game is instructed by a user, the CPU 21 executes a game program shown in FIG. 14 in the form of a flowchart. The CPU 21 starts the execution of the program from step 1400 and proceeds to step 1405 in order to perform initial setting of the game. During the initial setting, the user sets conditions regarding progress of the game (conditions for changing the progress) and other data. Such conditions are used in step 1425, which will be described later.

In step 1405, the user further designates whether azimuth $\alpha$ and inclination angle $\beta$, or azimuth angle change $\Delta\alpha$ and inclination angle change $\Delta\beta$ are to serve as parameters used in step 1425 (parameters used in the game). When the parameters regarding azimuth and inclination angle and used in step 1425 are azimuth $\alpha$ and inclination angle $\beta$, the progress of the program is set in such a manner that the CPU 21 performs only the processing for an azimuth/inclination angle calculation mode without entering an angle change calculation mode, which will be described later, in the routine shown in FIG. 15. By contrast, when the parameters regarding azimuth and inclination angle and used in step 1425 are azimuth angle change $\Delta\alpha$ and inclination angle change $\Delta\beta$, the progress of the program is set in such a manner that the CPU 21 enters the angle change calculation mode in the routine shown in FIG. 15.

The description will be continued on the assumption that the initial setting in the above-described step 1405 has been performed in such a manner that azimuth $\alpha$ and inclination angle $\beta$ serve as the parameters regarding azimuth and inclination angle and used in step 1425.

Subsequently, the CPU 21 proceeds to step 1410 so as to obtain operation data which the user inputs from the operation section 15. In subsequent step 1415, the CPU 21 calculates the present position (latitude and longitude) of the cellular phone 10 by use of the GPS circuit 25. This step 1415 realizes the function of positioning means (present position measurement means).

Subsequently, the CPU 21 proceeds to step 1420 in order to calculate azimuth, etc. from the outputs Sx and Sy of the magnetic sensor unit 30. Specifically, the CPU 21 executes a routine shown in FIG. 15 and adapted to calculate azimuth, etc. After having started the processing for the routine from step 1500, the CPU 21 proceeds to step 1505 in order to read the output Sx of the X-axis magnetic sensor 31 and the output Sy of the Y-axis magnetic sensor 32.

Subsequently, the CPU 21 proceeds to step 1510 in order to obtain an actual azimuth $\alpha$ and an actual inclination angle $\beta$ on the basis of the above-described read outputs Sx and Sy and with reference to the conversion table shown in the above-described Table 1. Notably, this step 1510 realizes each of the functions of the azimuth determination means, the inclination angle determination means, and the azimuth/inclination angle determination means.

Subsequently, the CPU 21 proceeds to step 1515 in order to determine whether the present mode is the angle change calculation mode. As described above, at the present stage, setting has been performed in such a manner that azimuth $\alpha$ and inclination angle $\beta$ are used as the parameters regarding azimuth and inclination angle in step 1425, and therefore, the progress of the program has been set so as to prevent the CPU 21 from entering the angle change calculation mode. Therefore, the result of the determination by the CPU 21 in step 1515 becomes "No," and the CPU 21 proceeds to step 1520. In step 1520, the CPU 21 saves the azimuth $\alpha$ and inclination angle $\beta$ obtained in the above-described step 1510, as values to be used in step 1425 of FIG. 14. Subsequently, the CPU 21 proceeds to step 1425 of FIG. 14 via step 1595.

In step 1425, the CPU 21 determines whether the azimuth $\alpha$ and inclination angle $\beta$ saved in the above-described step 1520 match the conditions set in the above-described step 1405 (or separately determined conditions) and further determines whether the present position obtained in step 1415 and/or operation data input by the user match the conditions set in the above-described step 1405 (or separately determined conditions).

When the result of the determination by the CPU 21 in step 1425 becomes "Yes," the CPU 21 proceeds to step 1430 in order to perform processing for advancing the game (control for advancing the game). More specifically, in step 1430, the CPU 21 changes the display screen, BGM, and sound effect; calculates a score; and performs other processing. At this time, the screen, BGM, and sound effect may be changed in accordance with the azimuth $\alpha$ and/or inclination angle $\beta$ saved in the above-described step 1520. By contrast, when the result of the determination by the CPU 21 in step 1425 becomes "No," the CPU 21 proceeds directly to step 1435 without performance of step 1430.

The CPU 21 performs other processing, including clocking operation, in step 1435, and then proceeds to step 1440 in order to determine whether conditions for ending the game are established. When the result of the determination by the CPU 21 in step 1440 becomes "Yes," the CPU 21 ends the present routine in step 1495. By contrast, when the result of the determination by the CPU 21 in step 1440 becomes "No," the CPU 21 returns to step 1410.

Next, there will be described the operation for the case in which the initial setting in the above-described step 1405 has been performed in such a manner that azimuth angle change $\Delta\alpha$ and inclination angle change $\Delta\beta$ serve as the parameters regarding azimuth and inclination angle and used in step 1425. In this case, as described above, the progress of the program is set in such a manner that the CPU 21 enters the angle change calculation mode in the routine shown in FIG. 15.

Therefore, when the CPU 21 is executing step 1420 (i.e., the routine shown in FIG. 15) for the first time after having started execution of the routine shown in FIG. 14, the result of the determination by the CPU 21 in step 1515 of FIG. 15 becomes "Yes." As a result, the CPU 21 proceeds to step 1525 in order to determine whether the present routine is being executed for the first time after the CPU 21 has entered the angle change calculation mode. Since at the present stage the CPU 21 is executing the present routine for the first time after having entered the angle change calculation mode, the result of the determination by the CPU 21 in step 1525 becomes "Yes." In this case, the CPU 21 proceeds to step 1530 in order to store as a reference azimuth $\alpha_0$ the azimuth $\alpha$ at the present time obtained in the above-described step 1510, and to store as a reference inclination angle $\beta_0$ the inclination angle $\beta$ at the present time obtained in above-described step 1510. Subsequently, the CPU 21 proceeds via step 1595 to step 1425 and subsequent steps.

As a result, when the CPU 21 again executes step 1420 (i.e., the routine shown in FIG. 15), the result of the determination by the CPU 21 in step 1525 of FIG. 15 becomes "No." As a result, the CPU 21 proceeds to step 1535. In step 1535, the CPU 21 stores as an azimuth angle change (lateral rotation change angle) $\Delta\alpha$ a value obtained by subtracting the stored reference azimuth $\alpha_0$ from the azimuth $\alpha$ at the present time, and stores as an inclination angle change (vertical rotation change angle) $\Delta\beta$ a value obtained by subtracting the stored reference inclination angle $\beta_0$ from the inclination angle $\beta$ at the present time. Subsequently, the CPU 21 proceeds to step 1540 in order to save the stored azimuth angle change $\Delta\alpha$ and the stored inclination angle change $\Delta\beta$ as values to be used in step 1425 of FIG. 14. Subsequently, the CPU 21 proceeds to step 1425 of FIG. 14 via step 1595.

In step 1425, the CPU 21 determines whether the azimuth angle change $\Delta\alpha$ and the inclination angle change $\Delta\beta$ match the conditions set in the above-described step 1405. When the result of the determination by the CPU 21 in step 1425 becomes "Yes," the CPU 21 proceeds to step 1430 in order to perform processing for advancing the game (control for advancing the game). At this time, the screen, BGM, and sound effect may be changed in accordance with the azimuth angle change $\Delta\alpha$ and/or inclination angle change $\Delta\beta$ saved in the above-described step 1540.

As described above, the electronic apparatus (the cellular phone 10) according to the present embodiment is provided with a game execution means (the routine shown in FIG. 14) for executing a game program shown in FIG. 14 to thereby provide a game to a user and for controlling the progress of the game (i.e., the game program) on the basis of the determined azimuth $\alpha$ and inclination angle $\beta$ (values corresponding to the azimuth $\alpha$ and inclination angle $\beta$). The progress of the game may be changed on the basis of any of combinations of azimuth $\alpha$ and inclination angle $\beta$; azimuth $\alpha$ and inclination angle change $\Delta\beta$; azimuth angle change $\Delta\alpha$ and inclination angle $\beta$; and azimuth angle change $\Delta\alpha$ and inclination angle change $\Delta\beta$. Further, the progress of the game may be changed on the basis of a rate of change in inclination angle $\beta$ or a rate of change in azimuth $\alpha$.

The above-described configuration enables provision of a game whose progress changes in accordance with the position, azimuth $\alpha$, inclination angle $\beta$, etc. of the electronic apparatus (cellular phone 10), which are changed by the user. Accordingly, the electronic apparatus can provide games which can impart to the user an operation feeling which the user has never experienced. Examples of such games include a role playing game in which the user cannot proceed to a next stage until a specific position, a specific azimuth, etc. are attained, a game having a story limited to a certain area, a game in which a character grows in accordance with the extent of movement of the user, and a game in which use of words (dialect) changes depending on an area in which the user is present. Moreover, such an electronic apparatus can provide developers of game software with an opportunity to develop games (game programs) in which the position, azimuth, inclination angle, etc. of the electronic apparatus are utilized in progress of the games.

Next, still another embodiment of the electronic apparatus according to the present invention will be described. A cellular phone 10 of the present embodiment differs from that of the above-described embodiment mainly in that a change in angular position of the longitudinal axis of the electronic apparatus main body within a vertical plane (inclination angle change $\Delta\beta$) and a change in angular position of the transverse axis of the electronic apparatus main body about the longitudinal axis (rotational angle change $\Delta\gamma$, twist angle change $\Delta\gamma$) are calculated and used for display of a map or the like and/or control of a game. Mainly this difference will be described hereinbelow.

Method of obtaining angle changes $\Delta\beta$ and $\Delta\gamma$:

First, there will be described a method of obtaining a change $\Delta\beta$ in the inclination angle $\beta$ of the longitudinal axis (Y-axis) of the main body 11 of the electronic apparatus 10 and a change $\Delta\gamma$ in the rotational angle $\gamma$ (twist angle $\gamma$) of the transverse axis of the main body 11 about the longitudinal axis. Here, the cellular phone 10 is assumed to be held in the posture shown in FIG. 16, wherein the azimuth of the longitudinal axis of the cellular phone 10 is represented by $\alpha$, the inclination angle of the longitudinal axis is represented by $\beta$, and the rotational angle about the longitudinal axis is represented by $\gamma$. Further, a unit vector directed toward the rightward transverse-axis direction (the positive X-axis direction) of the main body 11 of the electronic apparatus 10 is represented by Vx; a unit vector directed toward the upward longitudinal-axis direction (the positive Y-axis direction) of the main body 11 of the electronic apparatus 10 is represented by Vy; and a unit vector extending along an axis perpendicular to the front face (the X-Y plane) of the cellular phone 10 in the direction away from the surface is represented by Vz.

Here, a method of representing these unit vectors Vx, Vy, and Vz by use of azimuth $\alpha$, inclination angle $\beta$, and rotational angle $\gamma$ will be discussed. In order to simplify description, provision of a Z-axis magnetic sensor for outputting an output value Sz corresponding to a Z-axis component of an external magnetic field is assumed. Although the cellular phone 10 does not include such a Z-axis magnetic sensor, the Z-axis magnetic sensor has the same structure as that of the X-axis magnetic sensor 31.

Figure 16:
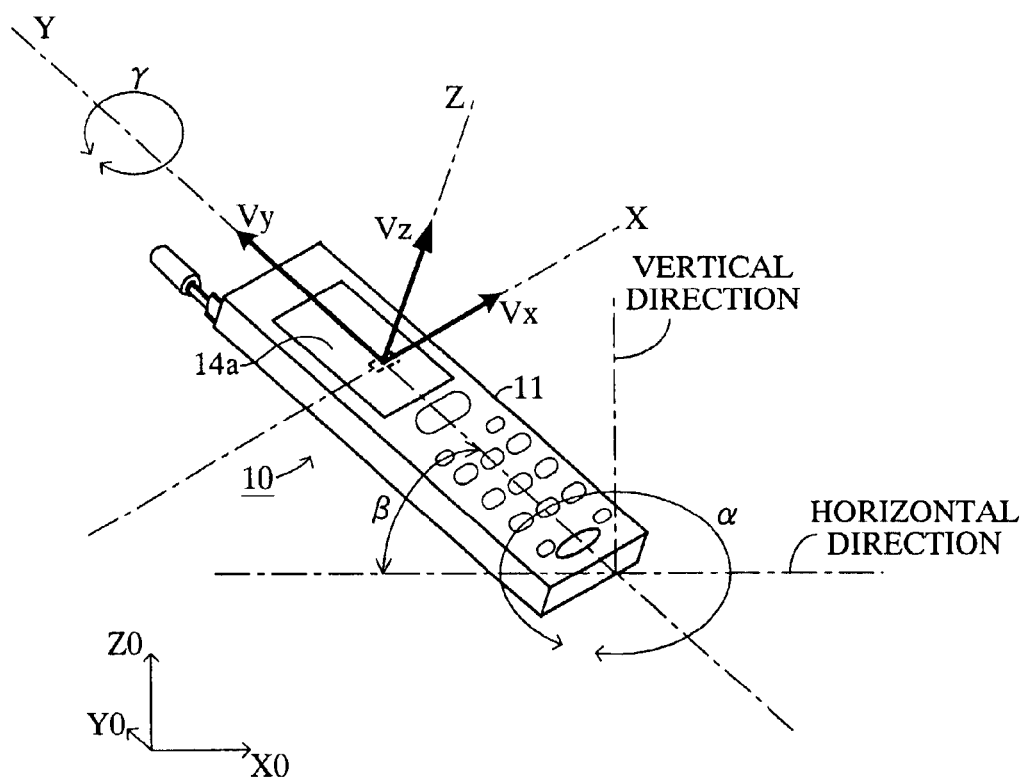
FIG. 16 is a view for explaining the principle of determining angular change of the cellular phone shown in FIG. 1.

A procedure for bringing the cellular phone 10 into the state shown in FIG. 16 will be described. First, in the right-handed orthogonal coordinate system (X0, Y0, Z0) shown in FIG. 16, the Y-axis of the cellular phone 10 (the longitudinal axis of the main body 11) is made coincident with the Y0 axis in order to render the azimuth $\alpha$ zero; and the X-Y plane of the main body 11 is made coincident with the X0-Y0 plane in order to render the inclination angle $\beta$ zero and to render the rotational angle $\gamma$ zero. Notably, the X0-Y0 plane is parallel to a horizontal plane; the positive Y0-axis direction is to the south; and the Z0-axis is parallel to a vertical axis. Then, the cellular phone 10 in this state is moved according to the following steps (a) to (c), whereby the cellular phone 10 is brought into the state shown in FIG. 16.

(a) Rotate the cellular phone 10 about the Y-axis by the angle $\gamma$.
(b) Rotate the Y-axis by the angle $\beta$ in a vertical plane.
(c) Rotate the positive Y-axis direction by the angle $\alpha$ about the vertical axis (the Z0 axis).

The rotation operation in (a) above can be expressed by the following matrix C.

$$C = \begin{bmatrix} \cos\gamma & 0 & \sin\gamma \\ 0 & 1 & 0 \\ -\sin\gamma & 0 & \cos\gamma \end{bmatrix} \quad (1)$$

The rotation operation in (b) above can be expressed by the following matrix B.

$$B = \begin{bmatrix} 1 & 0 & 0 \\ 0 & \cos\beta & -\sin\beta \\ 0 & \sin\beta & \cos\beta \end{bmatrix} \quad (2)$$

The rotation operation in (c) above can be expressed by the following matrix A.

$$A = \begin{bmatrix} \cos\alpha & \sin\alpha & 0 \\ -\sin\alpha & \cos\alpha & 0 \\ 0 & 0 & 1 \end{bmatrix} \quad (3)$$

Therefore, the operation in the above-described steps (a) to (c) can be represented by the following matrix.

$$ABC = \begin{bmatrix} \cos\alpha\cos\gamma + \sin\alpha\sin\beta\sin\gamma & \sin\alpha\cos\beta & \cos\alpha\sin\gamma - \sin\alpha\sin\beta\cos\gamma \\ -\sin\alpha\cos\gamma + \cos\alpha\sin\beta\sin\gamma & \cos\alpha\cos\beta & -\sin\alpha\sin\gamma - \cos\alpha\sin\beta\cos\gamma \\ -\cos\beta\sin\gamma & \sin\beta & \cos\beta\cos\gamma \end{bmatrix} \quad (4)$$

Accordingly, if a unit vector V0x=(1, 0, 0) along the X-axis direction, a unit vector V0y=(0, 1, 0) along the Y-axis direction, and a unit vector V0z=(0, 0, 1) along the Z-axis direction in the state in which the azimuth $\alpha$=0, the inclination angle $\beta$=0, and the rotation angle $\gamma$=0 are rotated by use of the above-described matrix ABC, the above-described unit vectors Vx, Vy, and Vz can be obtained as follows.

$$Vx = \begin{bmatrix} \cos\alpha\cos\gamma + \sin\alpha\sin\beta\sin\gamma \\ -\sin\alpha\cos\gamma + \cos\alpha\sin\beta\sin\gamma \\ -\cos\beta\sin\gamma \end{bmatrix} \quad (5)$$

$$Vy = \begin{bmatrix} \sin\alpha\cos\beta \\ \cos\alpha\cos\beta \\ \sin\beta \end{bmatrix} \quad (6)$$

$$Vz = \begin{bmatrix} \cos\alpha\sin\gamma - \sin\alpha\sin\beta\cos\gamma \\ -\sin\alpha\sin\gamma - \cos\alpha\sin\beta\cos\gamma \\ \cos\beta\cos\gamma \end{bmatrix} \quad (7)$$

When the vector VG of the geomagnetic field is assumed to be (0, Gp, Gs), the output Sx is expressed by mapping of the vector VG onto the unit vector Vx; i.e., by the inner product between the geomagnetic field vector VG and the unit vector Vx. Similarly, the output Sy is expressed as the inner product between the geomagnetic field vector VG and the unit vector Vy. Notably, when the cellular phone 10 is assumed to include a Z-axis magnetic sensor which detects an external magnetic field along the Z-axis direction perpendicular to the X-axis and Y-axis directions and outputs an output Sz corresponding thereto, the output Sz is expressed as the inner product between the geomagnetic field vector VG and the unit vector Vz. In this case as well, these outputs are normalized in such a manner that the outputs Sx, Sy, and Sz each assume "1" for a magnetic field having a strength 1 Oe along each of the positive X-axis direction, the positive Y-axis direction, and the positive Z-axis direction. As a result, the following expressions (8) to (10) are obtained.

$$Sx = Gp(-\sin\alpha\cos\gamma + \cos\alpha\sin\beta\sin\gamma) - Gs\cos\beta\sin\gamma \quad (8)$$

$$Sy = Gp\cos\alpha\cos\beta + Gs\sin\beta \quad (9)$$

$$Sz = Gp(-\sin\alpha\sin\gamma - \cos\alpha\sin\beta\cos\gamma) + Gs\cos\beta\cos\gamma \quad (10)$$

Next, in the case in which an image of, for example, a map displayed on the display panel 14a is scrolled through an operation of tilting the main body 11 of the cellular phone 10 (in the case of a scroll mode to be described later), the inclination angle change $\Delta\beta$ and the rotation angle change $\Delta\gamma$ should be obtained on the basis of the above-described expressions (8) and (9) on the assumption that the user changes the inclination angle $\beta$ and the rotation angle $\gamma$, while substantially maintaining the azimuth $\alpha$ at the initial azimuth (the reference azimuth) $\alpha_0$. At this time, it is assumed that $\beta = \beta_0 + \Delta\beta$ and $\gamma = 0 + \Delta\gamma$ (the initial inclination angle serving as a reference inclination angle $\beta = \beta_0$ and the initial rotation angle serving as a reference rotation angle $\gamma = 0$). It is also assumed that the angle changes $\Delta\beta$ and $\Delta\gamma$ are very small. Thus, the approximations represented by the following expressions (11) to (14) are used. As a result, the following expressions (15) and (16) are obtained.

$$\sin\Delta\beta = \Delta\beta \quad (11)$$

$$\cos\Delta\beta = 1 \quad (12)$$

$$\sin\Delta\gamma = \sin\gamma = \Delta\gamma = \gamma \quad (13)$$

$$\cos\Delta\gamma = \cos\gamma = 1 \quad (14)$$

$$Sx = Gp\{-\sin\alpha_0 + \Delta\gamma\cos\alpha_0(\sin\beta_0 + \Delta\beta\cos\beta_0)\} - Gs\Delta\gamma(\cos\beta_0 - \Delta\beta\sin\beta_0) \quad (15)$$

$$Sy = Gp\cos\alpha_0(\cos\beta_0 - \Delta\beta\sin\beta_0) + Gs(\sin\beta_0 + \Delta\beta\cos\beta_0) \quad (16)$$

Accordingly, from the above expressions (15) and (16), the angle changes $\Delta\beta$ and $\Delta\gamma$ are expressed as follows.

$$\Delta\beta = \frac{Sy - Gp\cos\alpha_0\cos\beta_0 - Gs\sin\beta_0}{Gs\cos\beta_0 - Gp\cos\alpha_0\sin\beta_0} \quad (17)$$

$$\Delta\gamma = \frac{Sx + Gp\sin\alpha_0}{Gp\cos\alpha_0(\sin\beta_0 + \Delta\beta\cos\beta_0) - Gs(\cos\beta_0 - \Delta\beta\sin\beta_0)} \quad (18)$$

In this case, the vector VG (0, Gp, Gs) of the geomagnetic field is determined univocally when the position of the cellular phone 10 is specified. Further, the azimuth $\alpha$ and the initial inclination angle $\beta$ when the CPU 21 has entered the scroll mode can be used as the initial azimuth $\alpha_0$ and the initial inclination angle $\beta_0$, respectively. Therefore, the angle changes $\Delta\beta$ and $\Delta\gamma$ can be obtained from the above-described expressions (17) and (18).

Next, actual operation of the cellular phone 10 will be described, starting from the case in which the cellular phone 10 has entered a map display mode through operation of a specific button among the plurality of push buttons 15a, but has not entered a scroll mode.

Figure 17:
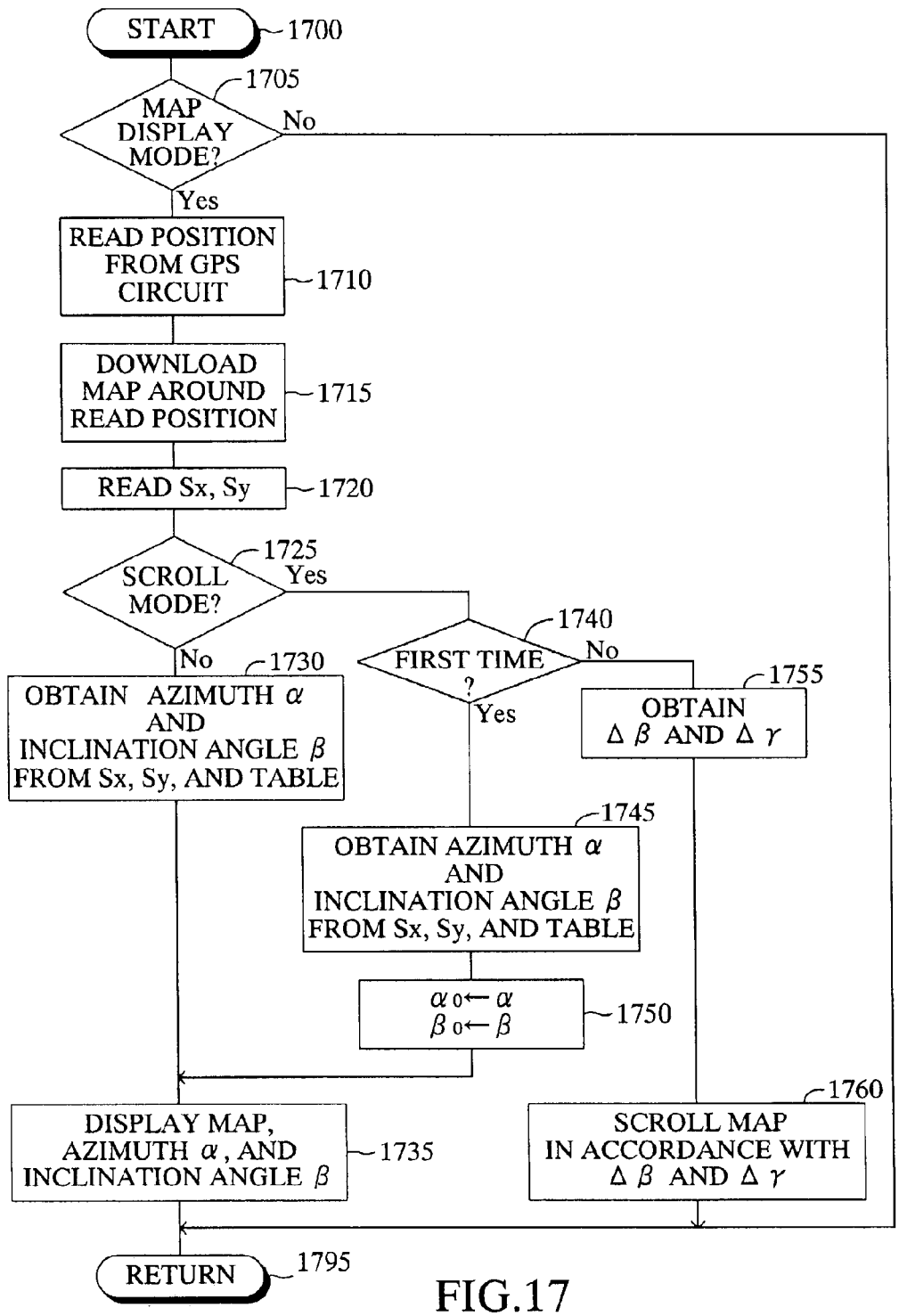
FIG. 17 is a flowchart relating to a third embodiment of the present invention and showing a program (routine) executed by the CPU of the cellular phone in order to display an screen (map) and to scroll the screen.

The CPU 21 of the cellular phone 10 repeatedly executes a routine (program) shown in FIG. 17 at predetermined time intervals. Therefore, when a predetermined timing has come, the CPU 21 starts the processing of this routine from step 1700, and proceeds to step 1705 in order to determine whether the present mode is the map display mode. At present, the CPU 21 has entered the map display mode, and therefore the result of the determination by the CPU 21 in step 1705 becomes "Yes." In this case, the CPU 21 proceeds to step 1710 in order to read the position of the cellular phone 10 which the GPS circuit 25 has specified by use of GPS signals. In subsequent step 1715, the CPU 21 transmits to the center data representing the read position, and downloads from the center data of a map showing the vicinity of the position.

Next, the CPU 21 proceeds to step 1720 so as to read the output Sx of the X-axis magnetic sensor 31 and the output Sy of the Y-axis magnetic sensor 32. In subsequent step 1725, the CPU 21 determines whether the present mode is the scroll mode. Under the above-described assumption, the CPU 21 has not entered the scroll mode. Therefore, the result of the determination by the CPU 21 in step 1725 becomes "No," and the CPU 21 proceeds to step 1730. In step 1730, the CPU 21 reads the conversion table shown in the above-described Table 1 from the ROM 22 and obtains an actual azimuth $\alpha$ and an actual inclination angle $\beta$ on the basis of the read outputs Sx and Sy and with reference to the read conversion table. For example, when the outputs Sx and Sy are −0.35 and 0.08, respectively, the azimuth $\alpha$ is obtained to be 256 (deg), and the inclination angle $\beta$ is obtained to be 1 (deg). Notably, step 1730 realizes the functions of the azimuth determination means and the inclination angle determination means.

Subsequently, the CPU 21 proceeds to step 1735 in order to display on the liquid crystal display panel 14a the map, the azimuth $\alpha$, and the inclination angle $\beta$ obtained in the above-described manner, and proceeds to step 1795 in order to end the present routine. As described above, when the CPU 21 has entered the map display mode but has not entered the scroll mode, a map corresponding to the present position of the cellular phone 10 is displayed, along with the azimuth $\alpha$ and the inclination angle $\beta$ of the cellular phone 10. Notably, the map may be displayed after being subjected to processing corresponding to the azimuth $\alpha$ and the inclination angle $\beta$; e.g., the map is displayed in such a manner that the top of the map coincides with the azimuth $\alpha$, or the map is distorted in accordance with the inclination angle $\beta$. Moreover, the azimuth $\alpha$ may be displayed by use of an image of an ordinary compass; specifically, an image of a circle on the which the positions of north, south, east, west are defined, and an image of a magnetic needle disposed in the circle (see FIG. 10A). In this case, the images may be displayed in such a manner that as the inclination angle $\beta$ increases, the vertical axis of the circle becomes shorter than the horizontal axis thereof (see FIG. 11A). In this case, the length of the magnetic needle is reduced as the inclination angle $\beta$ of the cellular phone 10 increases, so that the user encounters a difficulty in determining the azimuth. Therefore, the user can be expected to use the cellular phone 10 while maintaining the front face of the cellular phone 10 parallel to a horizontal plane, thereby enabling detection of the azimuth α with improved accuracy.

Next, operation of the cellular phone 10 will be described for the case in which the user operates a specific push button in the state in which the CPU 21 is in the map display mode but not in the scroll mode, whereby the CPU 21 has entered the scroll mode. In this case as well, the CPU 21 starts the above-described processing from step 1700 at a predetermined timing, and executes the processing in steps 1705 to 1720 to thereby download map data corresponding to the position of the cellular phone 10 and read the output Sx of the X-axis magnetic sensor 31 and the output Sy of the Y-axis magnetic sensor 32. Subsequently, the CPU 21 proceeds to step 1725.

As described previously, since the CPU 21 has entered the scroll mode, the result of the determination by the CPU 21 in step 1725 becomes "Yes," and the CPU 21 proceeds to step 1740. In step 1740, the CPU 21 determines whether the present routine is being executed for the first time after the CPU 21 has entered the scroll mode.

At the present stage, the present routine is being executed for the first time after the CPU 21 has entered the scroll mode. Therefore, the result of the determination by the CPU 21 in step 1740 becomes "Yes," and the CPU 21 proceeds to step 1745. In step 1745, the actual azimuth α and the actual inclination angle β are obtained in the same manner as in step 1730. Subsequently, the CPU 21 proceeds to step 1750 in order to store the actual azimuth α as an initial azimuth $α_0$ and the actual inclination angle β as an initial inclination angle $β_0$. Subsequently, the CPU 21 displays the map, the azimuth α, and the inclination angle β in step 1735, and ends the present routine in step 1795.

When this state continues, the CPU 21 again starts the processing of the present routine from step 1700, executes the processing in steps 1705 to 1725, and proceeds to step 1740 in order to again perform the determination in step 1740. At the present stage, the present routine has already been executed after the CPU 21 had entered the scroll mode. Therefore, the result of the determination by the CPU 21 in step 1740 becomes "No," and the CPU 21 proceeds to step 1755. In step 1755, the CPU 21 obtains an inclination angle change Δβ and a rotational angle change Δγ in accordance with the above-described expressions (17) and (18), respectively. Notably, the horizontal component Gp and vertical component Gs of the geomagnetic field used in the expressions (17) and (18) are stored in the ROM in advance. This step 1755 constitutes longitudinal-axis change angle calculation means for obtaining the angle change Δβ and transverse-axis change angle calculation means for obtaining the angle change Δα.

Since the above-described horizontal component Gp and vertical component Gs change depending on the location where the cellular phone 10 is used, the cellular phone 10 may be configured in such a manner that a plurality of sets of horizontal components Gp and vertical components Gs are stored in the ROM while being related to different locations (latitudes and longitudes); and a horizontal component Gp and a vertical component Gs are read in accordance with the present position of the cellular phone 10 as obtained from the GPS circuit 25. Alternatively, the cellular phone 10 may be configured to transmit to an information center data regarding the present position of the cellular phone 10 as obtained from the GPS circuit 25 and obtain from the center a horizontal component Gp and a vertical component Gs corresponding to the location.

Subsequently, the CPU 21 proceeds to step 1760 in order to scroll the displayed map in accordance with the inclination angle change Δβ and the rotational angle change Δγ, as follows.

(1) When Δγ ≧ 10 (deg), the displayed map is scrolled in the positive X-axis direction.
(2) When Δγ ≦ -10 (deg), the displayed map is scrolled in the negative X-axis direction.
(3) When Δβ ≧ 10 (deg), the displayed map is scrolled in the positive Y-axis direction.
(4) When Δβ ≦ -10 (deg), the displayed map is scrolled in the negative Y-axis direction.

Subsequently, the CPU 21 proceeds to step 1795 so as to end the present routine. As described above, when the CPU 21 enters the scroll mode, an inclination angle change Δβ and a rotational angle change Δγ are obtained, and the displayed map is scrolled in accordance with these values. Notably, when the present mode is not the map display mode, the result of the determination by the CPU 21 in step 1705 becomes "No." In this case, the CPU 21 proceeds directly to step 1795, and ends the present routine immediately.

As described above, in the present embodiment, the inclination angle change Δβ or the rotational angle change Δγ is calculated by use of only the X-axis magnetic sensor 31, which outputs a value corresponding to a component of an external magnetic field along the transverse axis of the main body 11 of the cellular phone 10, and the Y-axis magnetic sensor 32, which outputs a value corresponding to a component of the external magnetic field along the longitudinal axis of the main body 11. Therefore, the inclination angle change Δβ and the rotational angle change Δγ can be obtained without addition of any other sensor. Further, since the map displayed on the display panel 14a is scrolled in accordance with the inclination angle change Δβ or the rotational angle change Δγ while the orientation of the map is maintained unchanged, the user can view a necessary portion of the map through a simple operation.

In the above-described embodiment, the conversion table is stored in the ROM 22 in advance. However, the cellular phone 10 may be configured to obtain the conversion table (values of the conversion table) from, for example, an information center via communication means. This configuration reduces the memory capacity of the ROM 22.

Moreover, in such a case, the cellular phone 10 may be configured to transmit to the information center data regarding the position of the cellular phone 10 specified by means of the GPS circuit 25 and to obtain via the communication means a conversion table (values of the conversion table) corresponding to the specified position. This configuration enables accurate determination of the azimuth α and the inclination angle β of the cellular phone 10 even when the geomagnetic field (the inclination of the geomagnetic field relative to a horizontal plane) changes due to use of the cellular phone 10 over a wide area.

Next, still another embodiment of the electronic apparatus according to the present invention will be described. A cellular phone 10 of the present embodiment differs from that of the above-described embodiment mainly in that an inclination angle change Δβ (change in angular position of the longitudinal axis of the electronic apparatus main body within a vertical plane) and a rotational angle change Δγ (change in angular position of the transverse axis of the electronic apparatus main body about the longitudinal axis) are calculated, and an image of, for example, a map displayed on the display section is scrolled more accurately on the basis of these angle changes. Mainly this difference will be described hereinbelow.

Figure 18:
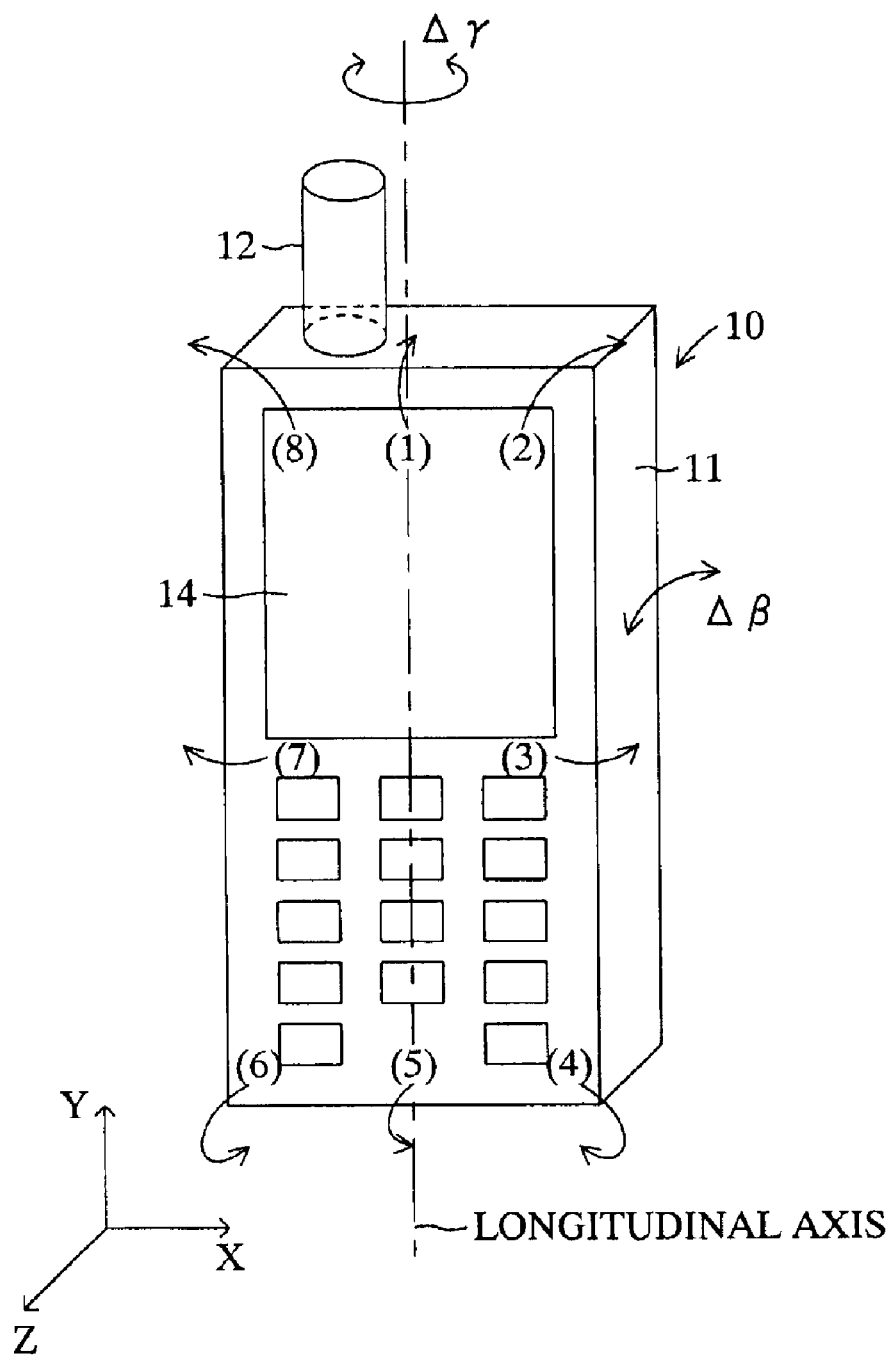
FIG. 18 is a view showing the relation between scroll direction of a displayed screen and change in inclination angle of the cellular phone shown in FIG. 1 and change in rotational angle of the cellular phone about the longitudinal axis thereof.

When, as shown in FIG. 18, the main body 11 of the cellular phone 10 is inclined (or rotated) in one of the directions indicated by arrows (1) to (8), the direction and amount of inclination (rotation) can be determined through obtainment of a change $\Delta\beta$ in the inclination angle (elevation angle) $\beta$ of the longitudinal axis (Y-axis) of the main body 11 relative to a horizontal plane and a change $\Delta\gamma$ in the rotational angle $\gamma$ of the transverse axis (X-axis) of the main body 11 about the longitudinal axis.

In the present embodiment, when the control mode of the cellular phone 10 is switched to the scroll mode, in response to a user's operation of tilting or rotating the main body 11 in one of the directions indicated by arrows (1) to (8), the inclination angle change $\Delta\beta$ and the rotational angle change $\Delta\gamma$ are obtained, and, on the basis of these angle changes, the screen displayed on the liquid crystal display section 14 is scrolled in a direction which is obtained by projecting an arrow representing the direction of tilt or rotation on the top face of the liquid crystal display section 14.

Figure 19:
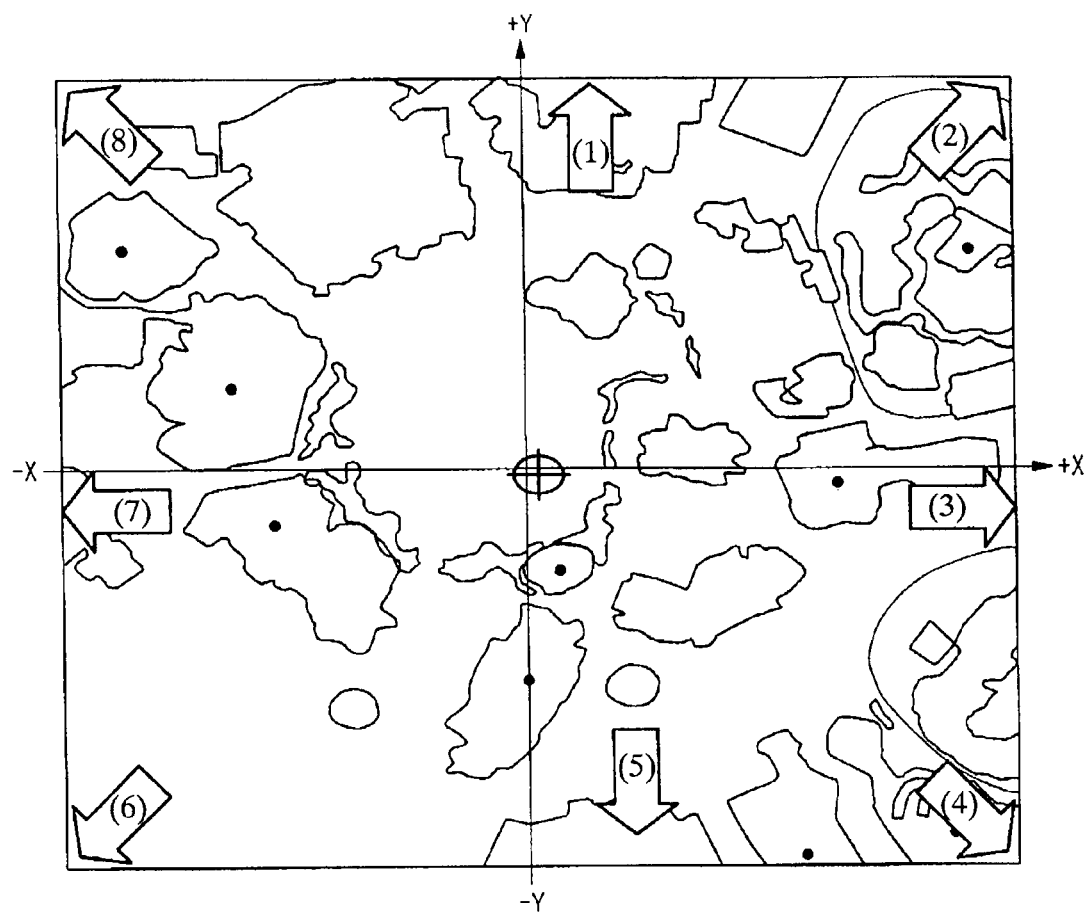
FIG. 19 is an illustration showing example directions in which a screen displayed on the display section of the cellular phone shown in FIG. 1 is scrolled.

For example, when the user tilts or rotates the main body 11 in one of the directions indicated by arrows (1) to (8) shown in FIG. 18 in a state in which a map (screen) shown in FIG. 19 is displayed on the liquid crystal display section 14, the map is scrolled in the corresponding direction among the directions indicated by outline arrows (1) to (8), which correspond to the arrows (1) to (8) in FIG. 18.

The CPU 21 refers to an angle change-scroll amount conversion table shown in FIG. 20 and scrolls the screen on the basis of this table. In the table of FIG. 20, positive-value ranges of the inclination angle change $\Delta\beta$ are provided for the case in which the near side of the main body 11 shown in FIG. 18 is lowered; i.e., the main body 11 is rotated in the direction indicated by arrow (5) in FIG. 18 (the upper half of the main body 11 is moved in the positive Z-axis direction, whereas the lower half of the main body 11 is moved in the negative Z-axis direction). In such a case, the map of FIG. 19 displayed on the display section 14 is scrolled in a direction indicated by an outline arrow (5) of FIG. 19 (negative Y direction). As a result, a portion of the map having been located in the direction of the outline arrow (1) is displayed on the display section 14.

By contrast, negative-value ranges of the inclination angle change $\Delta\beta$ are provided for the case in which the near side of the main body 11 shown in FIG. 18 is raised; i.e., the main body 11 is rotated in the direction indicated by arrow (1) in FIG. 18 (the upper half of the main body 11 is moved in the negative Z-axis direction, whereas the lower half of the main body 11 is moved in the positive Z-axis direction). In such a case, the map of FIG. 19 displayed on the display section 14 is scrolled in a direction indicated by an outline arrow (1) of FIG. 19 (positive Y direction). As a result, a portion of the map having been located in the direction of the outline arrow (5) is displayed on the display section 14.

Meanwhile, negative-value ranges of the inclination angle change $\Delta\gamma$ are provided for the case in which the main body 11 shown in FIG. 18 is rotated in a direction indicated by arrow (7) (the left half of the main body 11 is moved in the negative Z-axis direction, whereas the right half of the main body 11 is moved in the positive Z-axis direction). In such a case, the map of FIG. 19 displayed on the display section 14 is scrolled in a direction indicated by an outline arrow (7) of FIG. 19 (negative X direction). As a result, a portion of the map having been located in the direction of the outline arrow (3) is displayed on the display section 14.

By contrast, positive-value ranges of the inclination angle change $\Delta\gamma$ are provided for the case in which the main body 11 shown in FIG. 18 is rotated in a direction indicated by arrow (3) (the right half of the main body 11 is moved in the negative Z-axis direction, whereas the left half of the main body 11 is moved in the positive Z-axis direction). In such a case, the map of FIG. 19 displayed on the display section 14 is scrolled in a direction indicated by an outline arrow (3) of FIG. 19 (positive X direction). As a result, a portion of the map having been located in the direction of the outline arrow (7) is displayed on the display section 14.

Moreover, in the table of FIG. 20, scroll amounts (scroll speeds) are set to increase (in accordance) with absolute values of the angle changes $\Delta\beta$ and $\Delta\gamma$. Moreover, the values ranges are set in such a manner that when the angle changes $\Delta\beta$ and $\Delta\gamma$ (their absolute values) are small (i.e., $|\Delta\beta|<1$ (deg), $|\Delta\gamma|<1$ (deg)), scrolling is not performed, so as to cope with erroneous scrolling operation and enhance the stability of the displayed screen.

Figure 21:
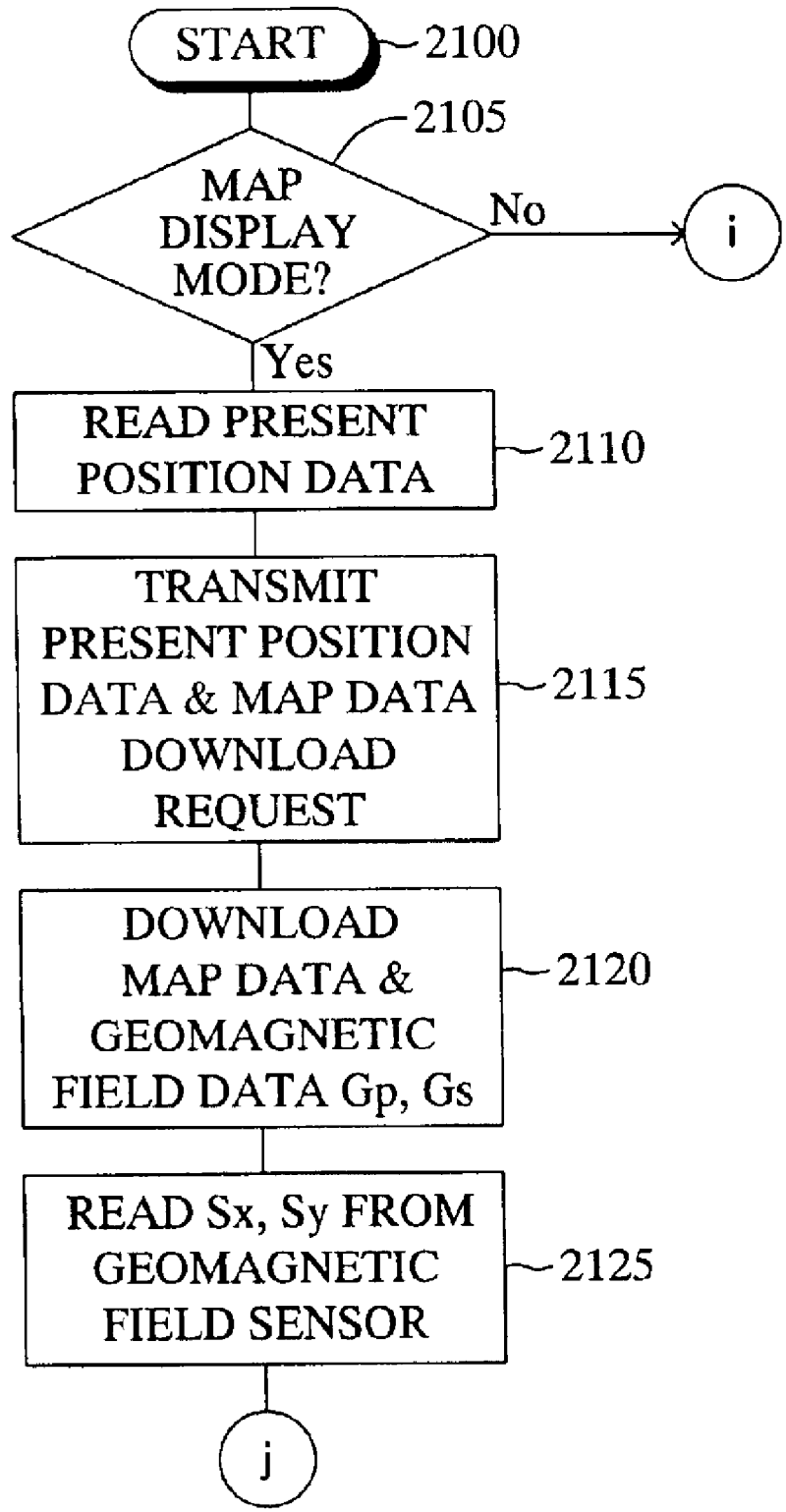
FIGS. 21 and 22 are flowcharts relating to the fourth embodiment of the present invention and showing a program (routine) executed by the CPU of the cellular phone to display an image (map) and to scroll the screen.
Figure 22:
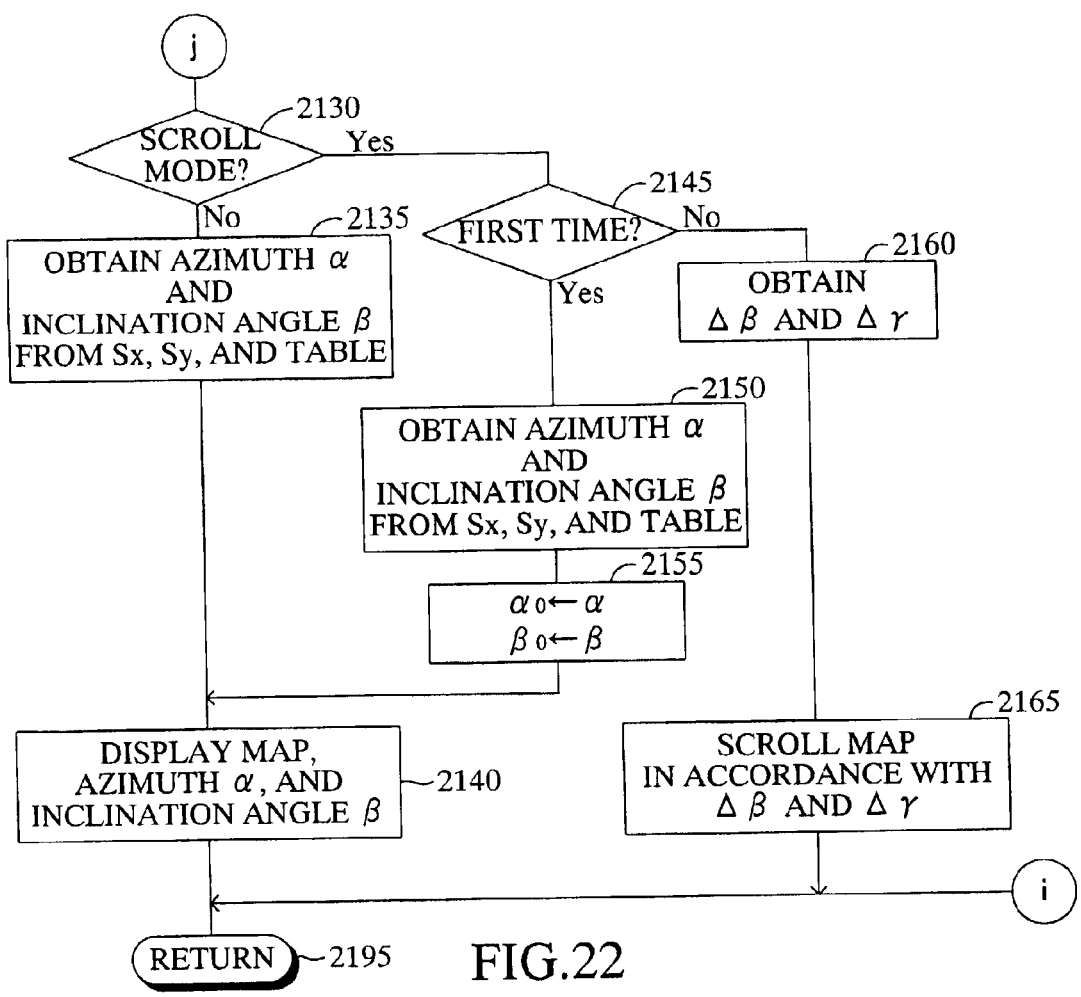

Next, actual operation of the cellular phone 10 will be described with reference to a routine which is executed by the CPU 21 and which is shown in FIGS. 21 and 22 in the form of a flowchart. By means of a timer interruption routine started at predetermined intervals, the CPU 21 is caused to start the processing from step 2100. In this example, a map display mode for displaying a map on the display section 14 and a scroll mode for scrolling the map displayed during the map display mode are provided as selectable control modes. These modes are selected on the basis of operation data indicative of operation of the operation section 15 effected by the user.

First, the case in which the map display mode has not been selected will be described. In step 2105 subsequent to step 2100, the CPU 21 determines whether the present mode is the map display mode. At the present time, the map display mode has not been selected. Therefore, the result of the determination by the CPU 21 in step 2105 becomes "No." In this case, the CPU 21 proceeds to step 2195 immediately in order to end the present routine.

Next, the case in which the map display mode has been selected but the scroll mode has not been selected will be described. In this case, the result of the determination by the CPU 21 in step 2105 becomes "Yes," and the CPU 21 proceeds to step 2110 in order to read present position data (latitude, longitude) representing the present position of the cellular phone 10 as specified by means of the GPS circuit 25.

Subsequently, the CPU 21 proceeds to step 2115 and transmits to the information center the above-described read present position data and a signal for requesting download of map data. In response thereto, the information center transmits data of a map around a position specified by the transmitted present position data and geomagnetic field data (Gp, Gs) at that position. The CPU 21 receives (downloads) such data in step 2120 and in step 2125 reads the outputs Sx and Sy of the magnetic sensors.

Subsequently, the CPU 21 proceeds to step 2130 and determines whether the scroll mode has been selected. As described above, at the present time, the scroll mode has not been selected. Therefore, the result of the determination by the CPU 21 in step 2130 becomes "No," and the CPU 21 proceeds to step 2135. In step 2135, the CPU 21 obtains an actual azimuth $\alpha$ and an actual inclination angle $\beta$ on the basis of the read outputs Sx and Sy and with reference to the conversion table shown in Table 1. Subsequently, the CPU 21 proceeds to step 2140 in order to display on the liquid crystal display panel 14a of the display section 14 a map (map screen) on the basis of the map data obtained in step 2120, as well as the azimuth $\alpha$ and the inclination angle $\beta$ obtained in step 2135. Subsequently, the CPU 21 proceeds to step 2195 in order to end the present routine.

Next, operation of the cellular phone 10 will be described for the case in which the scroll mode has been selected in the state in which the CPU 21 is in the map display mode. In this case, the result of the determination by the CPU 21 in step 2105 subsequent to step 2100 becomes "Yes," and the CPU 21 executes the above-described processing in steps 2110 to 2125, and then proceeds to step 2130. Notably, when the present position has not changed from the position at the time when this routine was last performed, steps 2115 and 2120 may be skipped.

As previously described, at the present time, the scroll mode has been selected. Therefore, the result of the determination by the CPU 21 in step 2130 becomes "Yes," and the CPU 21 proceeds to step 2145 in order to determine whether the present routine is being executed for the first time after the CPU 21 has entered the scroll mode.

At the present stage, the present routine is being executed for the first time after the CPU 21 has entered the scroll mode. Therefore, the result of the determination by the CPU 21 in step 2145 becomes "Yes," and the CPU 21 proceeds to step 2150. In step 2150, an actual azimuth $\alpha$ and an actual inclination angle $\beta$ are obtained in the same manner as in step 2135. Subsequently, the CPU 21 proceeds to step 2155 in order to store in a predetermined memory area of the RAM 23 the actual azimuth $\alpha$ as an initial azimuth $\alpha_0$ and the actual inclination angle $\beta$ as an initial inclination angle $\beta_0$. Subsequently, in step 2140, the CPU 21 displays the map, the azimuth $\alpha$, and the inclination angle $\beta$ on the display section 14 and, in step 2195, ends the present routine.

When this state continues, the present routine is started again. Therefore, the CPU 21 executes the processing in steps 2110 to 2125, and then proceeds to step 2130. In this case, the result of the determination in step 2130 becomes "Yes." Further, since execution of the present routine is not the first time after the CPU 21 has entered the scroll mode, the result of the determination in step 2145 becomes "No." Therefore, the CPU 21 proceeds to step 2160 in order to obtain an inclination angle change $\Delta\beta$ and a rotational angle change $\Delta\gamma$ in accordance with the above-described expressions (17) and (18), respectively, as in the above described step 1755. Notably, the horizontal component Gp and the vertical component Gs obtained in the above-described step 2120 are used in the expressions (17) and (18).

Subsequently, the CPU 21 proceeds to step 2165 in order to scroll the map, which is displayed on the display section 14 through the processing in step 2140, by an amount which is determined on the basis of the inclination angle change $\Delta\beta$ and the rotational angle change $\Delta\gamma$ calculated in step 2160 and with reference to the angle change-scroll amount conversion table shown in FIG. 20. As a result, the map (screen) is scrolled in one of the directions indicated by the above-described arrows (1) to (8) in accordance with the angle changes $\Delta\beta$ and $\Delta\gamma$. Subsequently, the CPU 21 proceeds to step 2195 in order to end the present routine.

As described above, in portable terminal apparatus (electronic apparatus) of the present embodiment having the magnetic sensor unit 30 for azimuth detection and the display section 14 for displaying various data, changes in the angle of the main body 11 (i.e., $\Delta\beta$ and $\Delta\gamma$) are detected on the basis of the output of the magnetic sensor unit 30, and the screen of the display section 14 is scrolled on the basis of the detected changes. Therefore, without provision of an additional dedicated sensor, the screen of the display section 14 can be scrolled through an operation of tilting the main body 11.

The embodiments of the present invention and their modifications have been described. However, the present invention is not limited thereto, and other modifications may be employed within the scope of the present invention, as follows. In the embodiments, the magnetic sensor unit 30 is constituted by use of GMR elements; however, the magnetic sensor unit 30 may be constituted by use of other types of magnetoresistive effect elements, such as magnetic tunnel effect elements (TMR). Further, the electronic apparatus above-described may be a mobile computer, including a PDA (Personal Digital Assistant), a portable game unit, or an operation unit (controller) of an electronic musical instrument. When the electronic apparatus is a portable game unit, characters in the game may be moved in accordance with the above-described angle changes $\Delta\alpha$, $\Delta\beta$ and $\Delta\gamma$. When the electronic apparatus is an operation unit of an electronic musical instrument, the volume and tone color of played music may be changed in accordance with the above-described angle changes $\Delta\alpha$, $\Delta\beta$ and $\Delta\gamma$.

Moreover, in the above-described embodiments, the output Sx of the X-axis magnetic sensor 31 and the output Sy of the Y-axis magnetic sensor 32 are normalized. However, before the normalization, offset OFx and OFy of the outputs Sx and Sy may be subtracted from the outputs Sx and Sy; and the resultant values may be used as corrected outputs Sx and Sy. Such offsets OFx and OFy are generated in response to the presence of a permanent magnet component near the X-axis magnetic sensor 31 and the Y-axis magnetic sensor 32 or variation in resistance among the GMR elements 31a to 31d and 32a to 32d. The offsets OFx and OFy can be obtained through a process of rotating the cellular phone 10 by 180° within a horizontal plane when predetermined conditions are satisfied, and averaging the values of each of the outputs Sx and Sy at that time.

Further, in the above-described embodiments, the X-axis serves as the transverse direction (the first axis) of the main body 11; and the Y-axis serves as the longitudinal direction (the second and third axes) of the main body 11. However, the present invention is not limited thereto. The first to third axes of the main body 11 may be determined freely so long as the first and second axes intersect each other at a predetermined angle $\theta$ (90° in the above-described embodiments).

Obviously, numerous modifications and variations of the present invention are possible in light of the above teachings. It is therefore to be understood that within the scope of the appended claims, the present invention may be practiced otherwise than as specifically described herein.

What is claimed is:

1. An electronic apparatus comprising:
   a main body;
   a first-axis magnetic sensor fixedly disposed within the main body and outputting a value corresponding to a component of an external magnetic field along a direction of a first axis of the main body;
   a second-axis magnetic sensor fixedly disposed within the main body and outputting a value corresponding to a component of the external magnetic field along a direction of a second axis of the main body, the second axis intersecting the first axis at a predetermined angle; and
   inclination angle determination means for determining an inclination angle of a third axis of the main body relative to a reference plane on the basis of values actually output from the first-axis and second-axis magnetic sensors and with reference to a conversion table defining a relation between values output from the first-axis and second-axis magnetic sensors and inclination angle of the third axis.

2. An electronic apparatus according to claim 1, further comprising:

a display section for displaying a screen on the basis of various data; and display control means for changing the displayed screen on the basis of the determined inclination angle.

3. An electronic apparatus according to claim 1, wherein a longitudinal axis in the state of use and a transverse axis perpendicular to the longitudinal axis are defined for the main body, the first axis corresponding to the transverse axis, and the second and third axes corresponding to the longitudinal axis; and the electronic apparatus further comprises longitudinal-axis change angle calculation means for saving, as a reference inclination angle, the inclination angle determined by the inclination angle determination means, and for calculating a change in the inclination angle of the longitudinal axis from the reference inclination angle on the basis of the reference inclination angle and an inclination angle presently determined by the inclination angle determination means.

4. An electronic apparatus comprising:

a main body;

a first-axis magnetic sensor fixedly disposed within the main body and outputting a value corresponding to a component of an external magnetic field along a direction of a first axis of the main body;

a second-axis magnetic sensor fixedly disposed within the main body and outputting a value corresponding to a component of the external magnetic field along a direction of a second axis of the main body, the second axis intersecting the first axis at a predetermined angle; and azimuth-inclination angle determination means for determining an azimuth of a third axis of the main body and an inclination angle of the third axis relative to a reference plane on the basis of values actually output from the first-axis and second-axis magnetic sensors and with reference to a conversion table defining relations between values output from the first-axis and second-axis magnetic sensors and azimuth of the third axis and between the values and inclination angle of the third axis.

5. An electronic apparatus according to claim 4, further comprising:

game execution means for executing a game program to thereby provide a game and for changing the progress of the game on the basis of the determined azimuth and inclination angle.

6. An electronic apparatus according to claim 4, wherein a longitudinal axis in the state of use and a transverse axis perpendicular to the longitudinal axis are defined for the main body, the first axis corresponding to the transverse axis, and the second and third axes corresponding to the longitudinal axis; and the electronic apparatus further comprises longitudinal-axis change angle calculation means for saving, as a reference azimuth and a reference inclination angle, the azimuth and inclination angle determined by the azimuth-inclination angle determination means, and for calculating a change in the inclination angle of the longitudinal axis from the reference inclination angle on the basis of the reference azimuth, the reference inclination angle, and the value output from the second-axis magnetic sensor.

7. An electronic apparatus according to claim 6, further comprising:

a display section for displaying a screen on the basis of various data; and display control means for scrolling the displayed screen along the direction of the longitudinal axis when the calculated change in the inclination angle is non-zero.

8. An electronic apparatus according to claim 7, wherein the display control means is configured to change the scroll speed of the screen in accordance with the magnitude of the calculated change in the inclination angle.

9. An electronic apparatus according to claim 7, wherein the display control means is configured not to scroll the screen when the calculated change in the inclination angle falls below a predetermined level.

10. An electronic apparatus according to claim 4, wherein a longitudinal axis in the state of use and a transverse axis perpendicular to the longitudinal axis are defined for the main body, the first axis corresponding to the transverse axis, and the second and third axes corresponding to the longitudinal axis; and the electronic apparatus further comprises transverse-axis change angle calculation means for saving, as a reference azimuth and a reference inclination angle, the azimuth and inclination angle determined by the azimuth-inclination angle determination means, and for calculating a change in the angular position of the transverse axis about the longitudinal axis on the basis of the reference azimuth, the reference inclination angle, and the value output from the first-axis magnetic sensor.

11. An electronic apparatus according to claim 10, further comprising:

a display section for displaying a screen on the basis of various data; and display control means for scrolling the displayed screen along the direction of the transverse axis when the calculated change in the angular position of the transverse axis about the longitudinal axis is non-zero.

12. An electronic apparatus according to claim 11, wherein the display control means is configured to change the scroll speed of the screen in accordance with the magnitude of the calculated change in the angular position of the transverse axis about the longitudinal axis.

13. An electronic apparatus according to claim 11, wherein the display control means is configured not to scroll the screen when the calculated change in the angular position of the transverse axis about the longitudinal axis falls below a predetermined level.

14. An electronic apparatus according to claim 4, further comprising:

communication means for effecting communications with the outside; and conversion table obtaining means for obtaining values of the conversion table via the communication means.

15. An electronic apparatus according to claim 14, further comprising position data obtaining means for obtaining position data indicating the position of the main body, and wherein the conversion table obtaining means being configured to obtain values of the conversion table corresponding to the position of the main body represented by the obtained position data.

16. An electronic apparatus according to claim 4, further comprising:

azimuth display means for displaying the determined azimuth by use of a predetermined image when the determined inclination angle is a predetermined angle, and for displaying the determined azimuth while distorting the predetermined image to an increasing degree in response to an increase in the determined inclination angle.

17. An electronic apparatus according to claim 4, wherein a longitudinal axis in the state of use and a transverse axis perpendicular to the longitudinal axis are defined for the main body, the first axis corresponding to the transverse axis, and the second and third axes corresponding to the longitudinal axis; and the electronic apparatus further comprises longitudinal-axis change angle calculation means for saving, as a reference inclination angle, the inclination angle determined by the azimuth-inclination angle determination means, and for calculating a change in the inclination angle of the longitudinal axis from the reference inclination angle on the basis of the reference inclination angle and an inclination angle presently determined by the azimuth-inclination angle determination means.

18. An electronic apparatus comprising:

a main body;

a first-axis magnetic sensor fixedly disposed within the main body and outputting a value corresponding to a component of an external magnetic field along a direction of a first axis of the main body;

a second-axis magnetic sensor fixedly disposed within the main body and outputting a value corresponding to a component of the external magnetic field along a direction of a second axis of the main body, the second axis intersecting the first axis at a predetermined angle;

position data obtaining means for obtaining position data indicating the position of the main body;

communication means for communicating with a center;

conversion table obtaining means for transmitting the obtained position data to the center via the communication means and for receiving table values of a first conversion table from the center when the center determines that the main body is present within an inclination correctable area in which the geomagnetic field is known, and receiving table values of a second conversion table or a signal from the center when the center determines that the main body is not present within the inclination correctable area, the first conversion table defining relations between values output from the first-axis and second-axis magnetic sensors and an azimuth of a third axis of the main body and between the values and an inclination angle of the third axis relative to a reference plane, the second conversion table defining a relation between values output from the first-axis and second-axis magnetic sensors and azimuth of the third axis on the assumption that the inclination angle of the third axis relative to the reference plane is a predetermined constant angle, the signal indicating to the effect that the inclination angle must be assumed to be the predetermined constant angle; and azimuth-inclination angle determination means for determining the azimuth and inclination angle of the third axis on the basis of values actually output from the first-axis and second-axis magnetic sensors and with reference to the obtained table values or the signal indicating to the effect that the inclination angle must be assumed to be the predetermined constant angle.

* * * * *